(12) United States Patent
Bushmitch

(10) Patent No.: US 10,698,577 B2
(45) Date of Patent: Jun. 30, 2020

(54) INTEGRATED MOBILE DEVICE

(71) Applicant: Dennis Bushmitch, Somerset, NJ (US)

(72) Inventor: Dennis Bushmitch, Somerset, NJ (US)

(*) Notice: Subject to any disclaimer, the term of this patent is extended or adjusted under 35 U.S.C. 154(b) by 544 days.

(21) Appl. No.: 14/778,199

(22) PCT Filed: Mar. 18, 2014

(86) PCT No.: PCT/US2014/031038
§ 371 (c)(1),
(2) Date: Sep. 18, 2015

(87) PCT Pub. No.: WO2014/153342
PCT Pub. Date: Sep. 25, 2014

(65) Prior Publication Data
US 2016/0139755 A1 May 19, 2016

Related U.S. Application Data

(60) Provisional application No. 61/852,524, filed on Mar. 18, 2013.

(51) Int. Cl.
*G06F 3/0484* (2013.01)
*H04W 4/48* (2018.01)
*H04W 4/02* (2018.01)
*H04L 9/32* (2006.01)
*H04W 12/06* (2009.01)
*H04L 12/28* (2006.01)
*G05B 15/02* (2006.01)
*H04L 29/08* (2006.01)
*H04L 12/40* (2006.01)

(52) U.S. Cl.
CPC .......... *G06F 3/0484* (2013.01); *G05B 15/02* (2013.01); *H04L 9/32* (2013.01); *H04L 9/3231* (2013.01); *H04L 12/282* (2013.01); *H04L 67/12* (2013.01); *H04L 67/141* (2013.01); *H04W 4/023* (2013.01); *H04W 4/48* (2018.02); *H04W 12/06* (2013.01); *H04L 2012/2841* (2013.01); *H04L 2012/40273* (2013.01); *H04L 2209/805* (2013.01); *H04L 2209/84* (2013.01)

(58) Field of Classification Search
CPC ....... G06F 3/0484; G05B 15/02; H04L 67/12; H04L 67/141
See application file for complete search history.

(56) References Cited

U.S. PATENT DOCUMENTS

| | | | | |
|---|---|---|---|---|
| 5,916,287 A | * | 6/1999 | Arjomand | F02B 77/08 701/33.2 |
| 9,229,905 B1 | * | 1/2016 | Penilla | G06F 17/00 |
| 9,230,438 B2 | * | 1/2016 | Barrett | G08G 1/0112 |
| 2001/0033225 A1 | * | 10/2001 | Razavi | G01C 21/26 340/425.5 |
| 2002/0087525 A1 | * | 7/2002 | Abbott | G06F 16/9535 |

(Continued)

*Primary Examiner* — Anil K Bhargava
(74) *Attorney, Agent, or Firm* — Hoffmann & Baron, LLP

(57) ABSTRACT

Provided are a system and method of interacting with a vehicle or a home control system. A context associated with a user input is obtained in relation to the vehicle or the home control system. An instruction based on the user input and the context is generated. The instruction is transmitted to the vehicle or the home control system to generate control or indication in connection with one of a component and a function of the vehicle or the home control system.

28 Claims, 12 Drawing Sheets

FIG. 1A

(56) References Cited

U.S. PATENT DOCUMENTS

| | | | |
|---|---|---|---|
| 2007/0015485 A1* | 1/2007 | DeBiasio | H04B 1/082 |
| | | | 455/345 |
| 2008/0215336 A1* | 9/2008 | Oesterling | G10L 15/26 |
| | | | 704/275 |
| 2009/0164216 A1* | 6/2009 | Chengalvarayan | |
| | | | B60R 16/0373 |
| | | | 704/251 |
| 2009/0227240 A1* | 9/2009 | Sheets | G06F 3/03545 |
| | | | 455/414.2 |
| 2011/0035096 A1* | 2/2011 | Liebl | G07C 5/008 |
| | | | 701/33.4 |
| 2011/0105103 A1* | 5/2011 | Ullrich | G06F 3/017 |
| | | | 455/420 |
| 2011/0113219 A1* | 5/2011 | Golshan | G06F 9/44505 |
| | | | 712/30 |
| 2011/0214162 A1* | 9/2011 | Brakensiek | G06F 21/6218 |
| | | | 726/4 |
| 2011/0215900 A1* | 9/2011 | Corradino | 340/5.53 |
| 2012/0041640 A1* | 2/2012 | Videtich | B60R 1/12 |
| | | | 701/34.4 |
| 2013/0102295 A1* | 4/2013 | Burke | H04L 67/125 |
| | | | 455/414.4 |
| 2013/0275899 A1* | 10/2013 | Schubert | G06F 3/0481 |
| | | | 715/765 |
| 2014/0058584 A1* | 2/2014 | Weng | G06F 7/00 |
| | | | 701/1 |
| 2014/0191886 A1* | 7/2014 | Barrett | G08G 1/0112 |
| | | | 340/989 |
| 2014/0222618 A1* | 8/2014 | Stamp | G06Q 30/0611 |
| | | | 705/26.35 |
| 2015/0029987 A1* | 1/2015 | Addepalli | H04W 72/0406 |
| | | | 370/329 |
| 2018/0059913 A1* | 3/2018 | Penilla | H04L 63/083 |

* cited by examiner

INTEGRATED MOBILE DEVICE

CROSS REFERENCE TO RELATED APPLICATIONS

This application is the U.S. National Phase of International Patent Application No. PCT/US2014/031038, filed on 18 Mar. 2014, which claims benefit of U.S. Provisional Patent Application No. 61/852,524 filed on Mar. 18, 2013, the contents of which are incorporated herein by reference in their entirety.

BACKGROUND

Field

The present application relates generally to mobile devices. More specifically, the present application is directed to a system and method of providing contextualized display and control functionality.

Brief Discussion of Related Art

Mobile devices have become ubiquitous in society for various applications, such as computing, telecommunications, music, and other applications. Many of the foregoing and other applications have been integrated into smart devices (e.g., iPads, smartphones), which can generally interconnect to other devices using protocols such as Bluetooth, NFC, Wi-Fi, 4G, as well as others, to provide richer functionality and worldwide interconnectivity.

Smart wearable devices have recently hit the marketplace and have received considerable attention. Smart wearable devices can include watches, fitness bands, and eyewear, just to mention a few smart wearable devices. These and other smart wearable devices integrate (e.g., using Bluetooth and/or other protocols) with mobile devices (e.g. smartphones) to provide users with computing and display functionality for data collected by, or otherwise available on, the smart wearable devices, enhancing user experience.

Moreover, new technologies are being developed to integrate mobile devices into vehicle-related systems. Examples of such integration include interconnectivity of smartphones (e.g., using Bluetooth and/or other protocols) with vehicle sound systems, which provide versatility in streaming music, making/receiving telephone calls, as well as a host of other applications. Some of these integrations not only provide efficiency and desirability but also facilitate safety, such as the ability to make/receive telephone calls or generate/receive instant messages hands free, just to mention a few.

The marketplace is heading in the direction of integration of mobile devices with the functionality of other systems (e.g., vehicle-related systems), providing new and/or improved functionality and applications, resulting in new and/or improved user freedoms in the collection, processing, display, control and communication of content.

Vehicle-related systems have seen an increase both in safety and technology, including new and improved functionality as well the integration with mobile devices, such as smartphones. Today, users desire access to applications and content in their vehicles and further desire to have personalized in-vehicle experience. Of course with improved vehicle-mobile device integration, a major concern is the safety in vehicle operation because of user (driver) cognitive distraction. Another major concern is content security associated with multiple integrated systems/devices. Strong user demand for applications and content in the vehicle continue to fuel these pressures, which remain unabated.

Accordingly, it is desirable to manage interaction and integration between the user, vehicle and mobile device, and other systems, in order to deliver applications and content to the user that provide personalized and contextualized display and control functionality, which are secure and address the safety concerns.

SUMMARY

The present application is directed to a system and methods for the integration of an integrated mobile device with a connectable vehicle(s) and a service provider(s). The system and methods provide for the selection and seamless integration of context associated with the integrated mobile device in relation to the connectable vehicle with user data and service provider data. Moreover, the system and methods provide control and display functionality based on the context selection and various other data as described herein in greater detail.

Similarly, the application is also directed to a system and methods for the integration of an integrated mobile device with a home control system(s) and a service provider(s). The system and methods provide for the selection and seamless integration of context associated with the integrated mobile device in relation to the home control system with user data and service provider data. Moreover, the system and methods provide control and display functionality based on the context selection and various other data.

In accordance with an embodiment or aspect, a method of interacting with a vehicle is disclosed. The method includes obtaining a context associated with a user input in relation to the vehicle. An instruction based on the user input and the context is generated. The instruction is then transmitted to the vehicle to generate control or indication in connection with one of a component and a function of the vehicle.

In accordance with another embodiment or aspect, a system to interact with a vehicle is disclosed. The system includes a processing device and a memory. The memory device stores instructions that, when executed by the processing device, cause the processing device to perform the following operations. The operations include obtaining a context associated with a user input in relation to the vehicle, generating an instruction based on the user input and the context, and transmitting the instruction to the vehicle to generate control or indication in connection with one of a component and a function of the vehicle.

In accordance with a further embodiment or aspect, a method of interacting with a home control system is disclosed. The method includes obtaining a context associated with a user input in relation to the home control system. An instruction based on the user input and the context is generated. The instruction is then transmitted to the home control system to generate control or indication in connection with one of a component and a function of the home control system.

In accordance with yet another embodiment or aspect, a system to interact with a home control system is disclosed. The system includes a processing device and a memory. The memory device stores instructions that, when executed by the processing device, cause the processing device to perform the following operations. The operations include obtaining a context associated with a user input in relation to the home control system, generating an instruction based on the user input and the context, and transmitting the instruction to the home control system to generate control or indication in connection with one of a component and a function of the home control system.

These and other purposes, goals and advantages of the present application will become apparent from the following detailed description read in connection with the accompanying drawings.

BRIEF DESCRIPTION OF THE DRAWINGS

Some embodiments or aspects are illustrated by way of example and not limitation in the figures of the accompanying drawings in which.

DETAILED DESCRIPTION

A system and method of providing contextualized information shaping for display and control functionality are disclosed herein. In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

Figure 1:
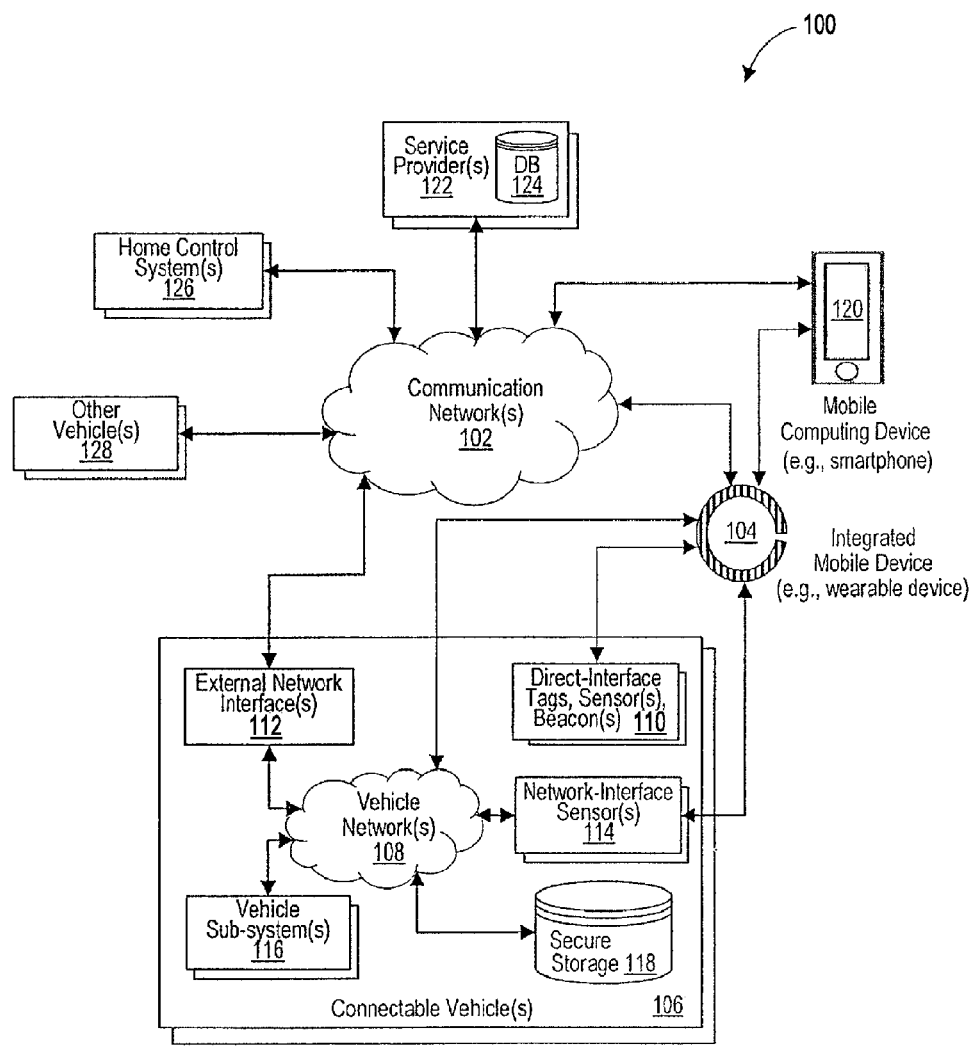
FIG. 1 illustrates an example system that, among other things, provides integration and communication of an integrated mobile device with a connectable vehicle and a service provider, and provides contextualized control and display functionality in connection with the connectable vehicle.

FIG. 1 illustrates an example system 100. The example system 100 provides integration of an integrated mobile device (e.g., smart wearable device) 104 with one or more connectable vehicles 106 and one or more mobile computing devices 120 (as well as other systems) to deliver applications/content to the user, which can provide information shaping and associated contextualized display and control functionality in connection with the connectable vehicles 106 and service providers 122.

In a vehicle-based implementations, context is defined by one or more factors including a physical location of the integrated mobile device 104 in relation to the connectable vehicle 106, authentication state of the user, physical activity of the user as determined (or accessible) by the integrated mobile device 104 and/or other systems of the connectable vehicle 106, state of the service provider 122 in relation to the connectable vehicle 106 and/or the user. Context can further be defined by one or more other factors including a physical location of the connectable vehicle 106, state of the vehicle and/or one or more sub-systems in relation to the above-mentioned user-related and service provider-related factors, as well as one or more other information and/or data elements.

In a home-based implementations, context is defined by one or more factors including a physical location of the integrated mobile device 104 in relation to the home control system 126, authentication state of the user, physical activity of the user as determined (or accessible) by the integrated mobile device 104, state of the service provider 122 in relation to the home control system 126 and/or the user. Context can further be defined by one or more other factors including a physical location of the home control system 126, state of the home control system, one or more sub-systems, or components therefor, in relation to the above-mentioned user-related and service provider-related factors, as well as one or more other information and/or data elements.

The example system 100 includes a communication network 102, an integrated mobile device 104 (e.g., smart wearable device as described below), a connectable vehicle 106, a mobile computing device (e.g., smartphone) 120 and a service provide device 122. In some embodiments, the system 100 can include a plurality of connectable vehicles 106 and a plurality of service provides 122. In some embodiments, the system 100 can also include one or more home control systems 126, as well as one or more other vehicles 128. The communication network 102 enables communication among the integrated mobile device 104, mobile device 120, connectable vehicles 106 and service providing systems 122. In various embodiments, the network 102 can also enable communication to/from home control systems 126 and other vehicles 128.

The communication network 102 can include one or more of long haul transport network (e.g., gigabit Ethernet network, Asynchronous Transfer Mode (ATM) network, and frame relay network), wireless network (e.g., satellite network, Wi-Fi network, Bluetooth network, cellular network, or another wireless network), other public or private networks, or any combination thereof. In addition, the communication network 102 can also include networks such as vehicle-to-vehicle (V2V), vehicle-to-infrastructure (V2I), commonly referred to as V2X networks that provide connectivity amongst vehicles as well as connectivity to/from infrastructure. The foregoing is not exhaustive and alternate or additional communication networks can be employed to interconnect the integrated mobile device(s) 104, mobile computing device(s) 120, connectable vehicle(s) 106 and service providing system(s) 122, as well as home control system(s) 126 and other vehicles 128.

The communication network 102 can include one or more of a wide area network (WAN), local area network (LAN), virtual private network (VPN), peer-to-peer (P2P) network, as well as any other public or private network, or any combination thereof. Other conventional or yet to be developed communications networks can form at least a part of the communication network 102. At least a portion of the transmission over the communication network 102 can be accomplished, for example, via Transfer Control Protocol/Internet Protocol (TCP/IP), User Datagram Protocol (UDP)/IP, or any combination of conventional protocols or yet to be developed protocols.

The integrated mobile device 104 can be a smart wearable device, such as bracelet or a watch that the user can wear around the user's wrist. The integrated mobile device 104 can also be any other type of smart wearable device, such as pendant, broach, eyeglasses, as well as any other smart wearable device that currently exists or is yet to be developed. The integrated mobile device 104 is configured to communicate with other systems and devices illustrated in FIG. 1, among others, whether directly and/or using one or more networks, such as networks 102, 108, to provide in a secure manner contextualized display and control functionality. The components and their operation of the integrated mobile device 104 are described in greater detail below with reference to FIG. 3. Mechanisms to provide secure communications, which can be used to provide user-to-integrated mobile device and user-to-vehicle authorization for contextualized display and control functionality, are described in greater detail below with reference to FIGS. 4 and 5. Contextualized display and control functionality are described in greater detail below with reference to FIGS. 8-11.

The connectable vehicle 106 is generally any vehicle (e.g., car, truck, bus, motorcycle, or any other machine that can transport people and/or things) that is configured to communicate with other systems and devices illustrated in FIG. 1, among others, whether directly and/or using one or more networks, such as networks 102, 108, to provide and/or deliver in a secure manner contextualized display and control functionality.

The connectable vehicle 106 includes a vehicle network(s) 108, direct-interface tag(s), sensor(s), beacon(s) 110 (referenced as direct sensors or $D_N$), external network interface(s) 112, network-interfaced sensor(s) 114 (referenced as network sensors of $S_N$), vehicle-subsystems 116 and secure storage database system 118. The vehicle network(s) 108 interconnects external network interface(s) 112, network sensors 114, and the secure storage database system 118.

The vehicle network 108 is generally any vehicle-based communication network or communication bus used to interconnect various vehicle function-related devices, sensors and subsystems. Examples of such networks include Controller Area Network (CAN), Domestic Digital Bus (D2B), Byteflight, FlexRay, DC-BUS, IDB-1394, J1850, LIN, MOST, Wi-Fi, Bluetooth. One or more of such networks are generally used to interconnect sub-systems like the Engine Control Unit (ECU), the Transmission Control Unit (TCU), the Anti-lock Braking System (ABS) and body control module (BCM) and other diverse devices, sensors and sub-systems.

The direct sensors 110 can include tags, sensors, and beacons. The direct sensors are configured to communicate with the integrated mobile device 104 using one or more communication protocols (e.g., RFID, NFC, Bluetooth, Wi-Fi, FM and/or other communication protocols). The direct sensors 110 have direct network connections to the integrated mobile device 104. The network sensors 114 can similarly include tags, sensors, and beacons, and are configured to communicate with the integrated mobile device 104 primarily over vehicle network(s) 108 using one or more communication protocols, such as RFID, NFC, CAN, D2B, Bluetooth, Wi-Fi, FM and/or other communication protocols. Moreover, network sensors 114 are connected to the vehicle network(s) 108 to facilitate communications to the vehicle sub-systems 116 and database 118 of the connectable vehicle 106, using one or more network communication protocols.

Figure 1A:
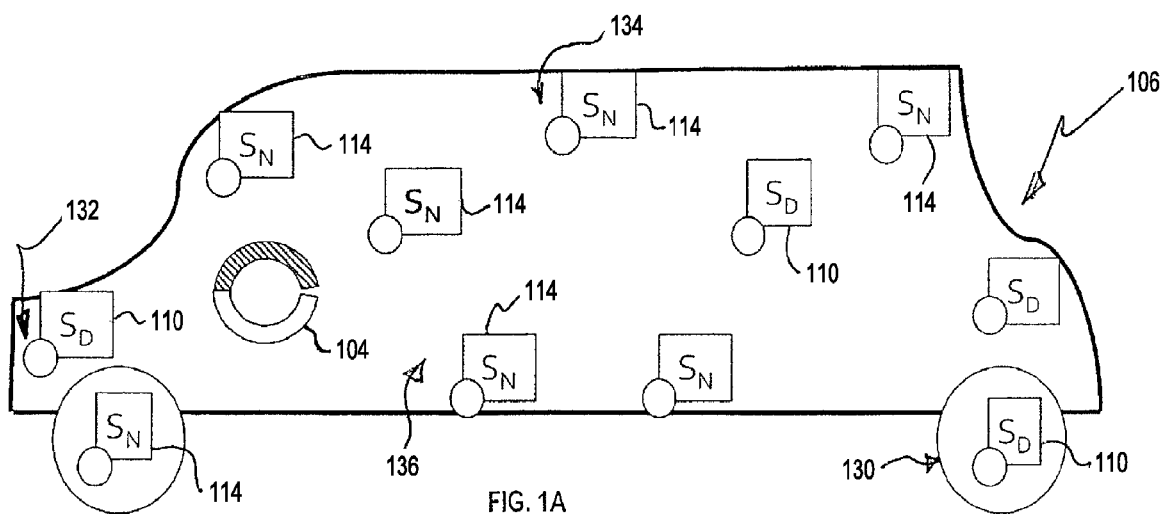
FIG. 1A illustrates an example block diagram of example connectable vehicle of FIG. 1 that includes one or more direct sensors and one or more network sensors.

Example positioning of the direct sensors 110, the network sensors 114 and the integrated mobile device 104 is illustrated in FIG. 1A. A direct sensor 110 (e.g., a Bluetooth or NFC beacon) can be associated directly with (and positioned proximately to) a component of the connectable vehicle 106 in connection with which the sensor is to determine a measurement value and to provide the measurement value to the integrated mobile device 104 over a direct or bus connection, for example. As an example, a direct sensor 110 can be associated with a particular tire as shown in FIG. 1A to provide tire pressure to the integrated mobile device 104 when the integrated mobile device 104 is in proximity to the tire. Similarly, other direct sensors 110 can provide measurements (e.g., oil pressure) in connection with other vehicle components (e.g., engine).

Network sensors 114 can be used to determine positioning of the integrated mobile device 104 in relation to components of the connectable vehicle. For example, a network sensor 114 can determine position of the integrated mobile device 104 in relation to a component (e.g., window/roof/sunroof controls, infotainment controls, seat controls, heating and cooling controls, or lighting controls, etc.) of the connectable vehicle 106. As another example, one or more of the network sensors 114 can also triangulate a position and/or proximity of the integrated mobile device 104 in relation to a particular component of the connectable vehicle 106, and can provide the positioning (and/or component) to the integrated mobile device 104. It should be noted that various types of data can be communicated to the integrated mobile device 104 via direct sensors 110, network sensors 114, and vehicle network(s) 108, including vehicle-based data, metadata, telemetry data, data from various vehicle sub-systems and systems, user authentication data, vehicle control and information data, as well as any other accessible data not enumerated herein.

The external network interface(s) 112 provide the ability for the connectable vehicle 106 (including its various sub-systems 116) to communicate with one or more mobile computing devices (e.g., smartphones) 120, one or more service providers 122, one or more home control systems 126, as well as to one or more other vehicles 128.

Figure 2:
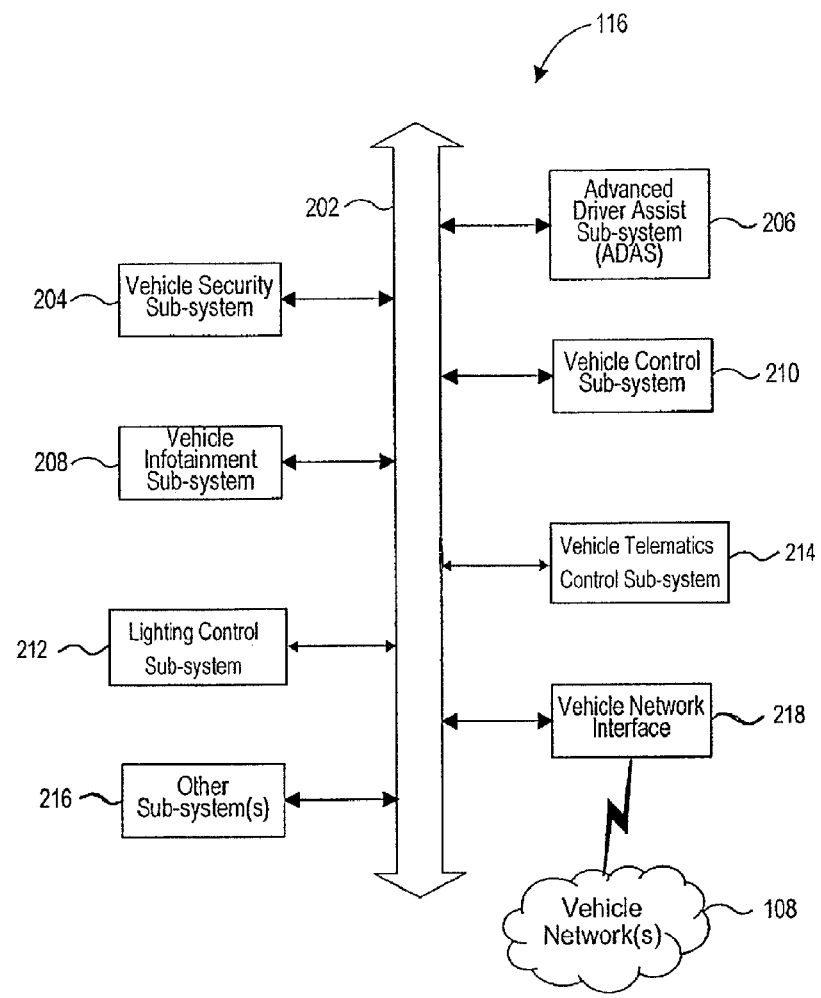
FIG. 2 illustrates a block diagram of example vehicle sub-systems in the connectable vehicle of FIG. 1.

The vehicle sub-system(s) 116 provide functionality to control various components of the connectable vehicle 106, such as security, lighting, navigation, infotainment, vehicle control, driver assist, telematics, and as well as a variety of other components, including Engine Control Unit (ECU), the Transmission Control Unit (TCU), the Anti-lock Braking System (ABS), body control module (BCM) and other diverse devices, sensors and sub-systems. Example vehicle sub-systems 116 are illustrated in FIG. 2. Various vehicle components, modules, systems and sub-systems can be interconnected by a bus (e.g., bus 202 in FIG. 2) and/or vehicle network(s) 108.

The secure storage database 118 is configured to maintain securely various security credentials (e.g., certificates) for establishing and maintaining communication sessions, as well as user and service provider(s) identities and associations, among the integrated mobile device 104, connectable vehicle 106 and service provider 122. Other data can be maintained in the secure storage database 118, as described in greater detail below.

The mobile computing device 120 can be any conventional smartphone, tablet or other computing device. The mobile device 120 includes wireless or wired access technology (e.g., Wi-Fi, cellular, Bluetooth, USB Direct, etc.) and can communicate with the integrated mobile device 104 and the connectable vehicle 106.

In the vehicle-based implementations, the service provider(s) 122 is typically related to the connectable vehicle(s) 106 and its users. For example, a BMW service provider 122 is related to a BMW connectable vehicle 106. It is noted, however, that various other service providers that are not related to the connectable vehicle 106 can be implemented in the system 100. Service providers 122 typically provide a range of services to the users of integrated mobile device 104 and/or users of the connectable vehicle 106. Such services include, but are not limited to, running remote applications on the integrated mobile device 104 and the connectable vehicle(s) 106, including its systems and sub-systems. Examples include vehicle maintenance monitoring services, weather assistance services, surveillance services, shopping services, external information referencing services, and a host of other types of services.

In the home-based implementations, the service provider(s) 122 is typically related to the home control system(s) 126 and its users. For example, an ADT service provider is related to an ADT home control system 126. As another example, an appliance service provider 122 (e.g., a sub-zero service provider) is related to an appliance (e.g., sub-zero refrigerator), which may be a component of the ADT home control system 126 or a sub-system of the home control system 126. It is noted, however, that various other service providers that are not related to home control system 126 can be implemented in the system 100. Service providers 122 typically provide a range of services to the users of integrated mobile device 104 and/or users of the home control systems 126. Such services include, but are not limited to, running remote applications on integrated mobile device 104 and home control system(s) 126, including various sub-systems and components. Examples include sub-system and/or component (appliances) maintenance and/or monitoring services, weather assistance services, surveillance services, shopping services, external information referencing services, and a host of other types of services.

The integrated mobile device 104 in a similar fashion can also provide and/or deliver in a secure manner contextualized display and control functionality with regard to one or more home control systems 126 as well as one or more other vehicles 128. In the home-based implementations, the integrated mobile device 104 can be a remote controller to a home security system reachable via communication network 102. In addition, the integrated mobile device 104 can also display a status of the home control system, can arm/disarm the home control system, and can relay to a user a status of various home-control sensors and systems. When doing so, the integrated mobile device 104 can utilize context-based control and display functionality as described with reference to FIGS. 8 and 9, and can further use secure communications as described with reference to FIGS. 5-7.

FIG. 1A illustrates a block diagram of example connectable vehicle 106 that includes one or more direct sensors 110 and one or more network sensors 114.

As illustrated in FIG. 1A, an example direct sensor 110 can be associated with a particular tire 130 to provide tire pressure to the integrated mobile device 104 when the integrated mobile device 104 is in proximity to the tire. Similarly, another example direct sensor 110 can provide an oil pressure measurement in connection with the engine 132 to the integrated mobile device 104. Other direct sensors 110 can be provided in associated with particulars components of the connectable vehicle 106. Direct sensors 110 are connected to integrated mobile device 104 over a direct network connection. They can also assist integrated mobile device 104 in determining its location in relation to other components of the connectable vehicle 106.

Network sensors 114 as well as direct sensors 110 can be used to determine position of the integrated mobile device 104 in relation to components of the connectable vehicle. For example, a network sensor 114 can determine position of the integrated mobile device 104 in relation to a sunroof component 134. As another example, a network sensor 114 can determine position of the integrated mobile device 104 in relation to seat component 136 of the connectable vehicle 106. Moreover, one or more of the network sensors 114 can also triangulate a position and/or proximity of the integrated mobile device 104 in relation to a particular component of the connectable vehicle 106, and can provide the positioning (and/or component) to the integrated mobile device 104. Direct sensors 110 and network sensors 114 provide a diverse sensory environment to the integrated mobile device 104, which can assist in context generation as will be described herein.

In the home-based implementations, one or more direct sensors 110 and one or more network sensors 114 can be associated with particular components of the home control system 126. For example, a direct sensor 110 or network sensor 114 can be associated with a refrigerator (or thermostat) component to provide internal temperature in the refrigerator/freezer (or the home). As another example, a direct sensor 110 or network sensor 114 can be associated with a component of the home control system (e.g., outside door lock) and can relay to a user a status of such component (e.g., locked). In similar fashion, the direct sensors 110 and the network sensors 112 can be used to determine position of the integrated mobile device 104 in relation to components of the home control system 126, which can similarly assist in context generation.

FIG. 2 illustrates a block diagram of example vehicle sub-systems 116 in the connectable vehicle 106 of the communication system 100. The vehicle sub-systems 116 can include a vehicle communication bus 202 that interconnects a security sub-system 204, advanced driver assist sub-system (ADAS) 206, infotainment sub-system 208, vehicle control sub-system 210, lighting control sub-system 212, telematics communication sub-system, as well as one or more other sub-systems and/or electronic components in the connectable vehicle 106. Vehicle interface 218 interconnects the sub-systems 204-216 to the vehicle network(s) 108 illustrated in FIG. 1, providing communication to other components of the connectable vehicle 106 and external devices, such as the integrated mobile device 104 via vehicle network(s) 108 and external network interface(s) 112. Examples of the vehicle communication bus 202 include but are not limited to Controller Area Network (CAN), Domestic Digital Bus (D2B), Byteflight, FlexRay, DC-BUS, IDB-1394, J1850, LIN, MOST, Wi-Fi, Bluetooth, as well as any other deployed or yet to be developed bus.

Figure 3:
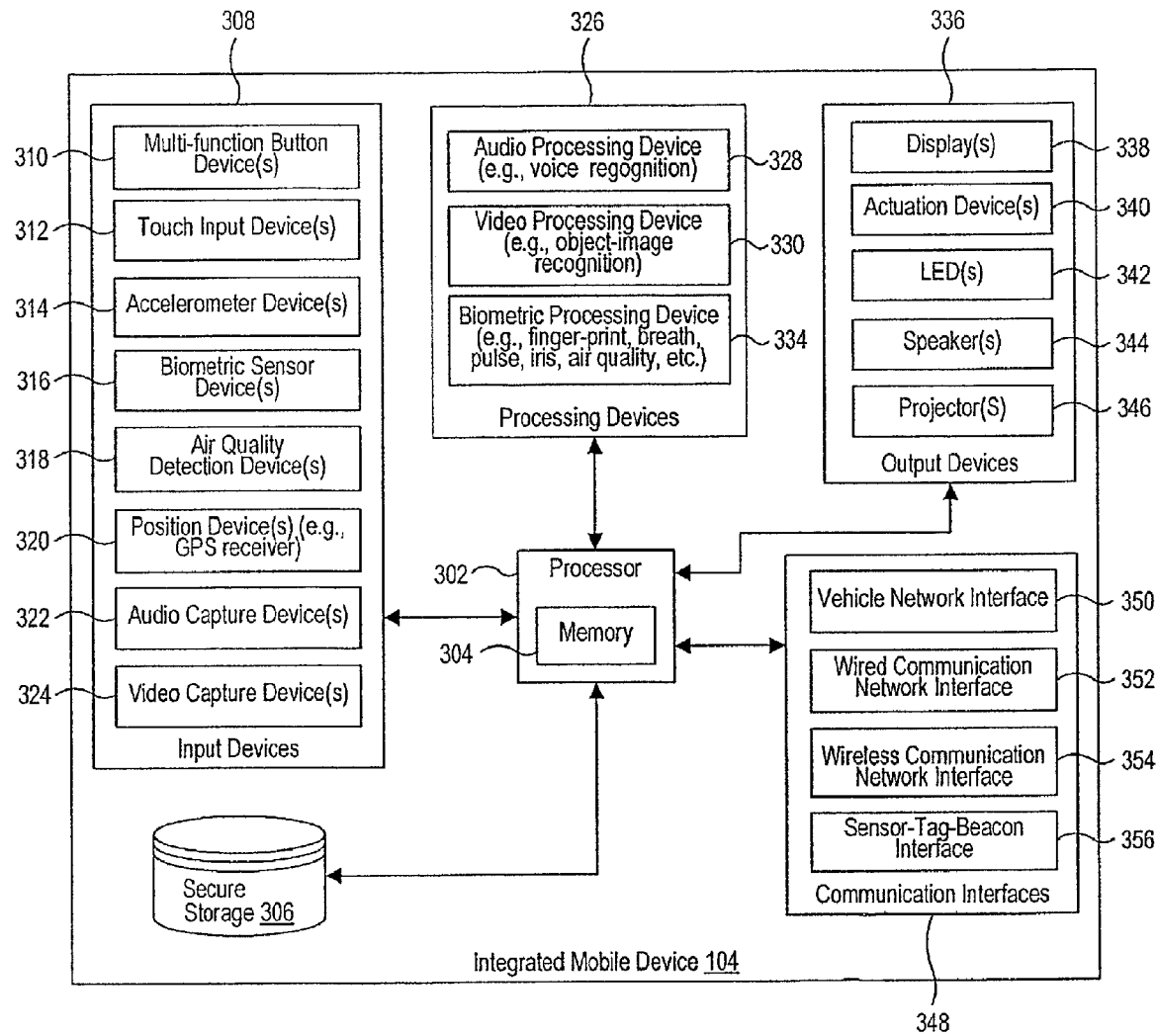
FIG. 3 illustrates a block diagram of an example integrated mobile device of FIG. 1.

FIG. 3 illustrates a block diagram of an example integrated mobile device 104 in the communication system 100.

The integrated mobile device 104 is configured provide personalized and information shaping, rendering and associated contextualized display and control functionality with regard to the connectable vehicle 106 (and/or home control system 126), among other functionalities, which can provide various technological improvements and address various safety concerns.

The integrated mobile device 104 includes a processor 302, memory 304, secure storage device 306, input devices 308, processing devices 326, output devices 336, and communication interfaces 348. The processor 302 is interconnected to the storage device 306, input devices 308, processing devices 326 and communication interfaces 348 in order to receive input, process input, display output, and communicate with other devices and/or systems of the communication system 100.

The processor 302 can execute the methods, functions or other logic as described herein. The memory 304 and/or storage database 306 include instructions (e.g., software) that embody one or more of the methods, functions or other logic as described herein. The instructions may reside completely, or at least partially, within the memory 304, secure storage 306 and/or within the processor 302 during execution by the processor 302 of integrated mobile device 104. The processor 302, memory 304, and storage 306 can also include computer-readable media to store instructions.

The storage device 306 stores various data and information described herein to facilitate the methods, functions and/or other logic as described in this disclosure. For example, the storage device 306 can store security credentials as described below with reference to FIGS. 4 and 5.

The input devices 308 receive various data and information described herein to facilitate the methods, functions and/or other logic as described in this disclosure. The input devices 308 include a multi-function button device(s) 310, a touch input device(s) 312, an accelerometer device(s) 314, a biometric device(s) 316, air quality detection device(s) 318, a position device(s) 320, audio capture device(s) 322, and video capture device(s) 324. The foregoing input devices 308 enable the user 401, 501 in FIGS. 4, 5 to provide different types of input, as well as to select and/or actuate various functionality, methods, functions and/or other logic as described herein based the input.

The multi-function button device(s) 310 can include various buttons or switches that can be depressed, toggled or otherwise actuated by a user to receive various inputs from the user 401, 501. The touch input device(s) 312 can include one or more touch devices (e.g., touchscreens) that can receive various inputs from a user. The accelerometer device(s) 314 can provide motion data, while the position device(s) 320 can provide position data, which are associated with the integrated mobile device 104.

The biometric device (316) can include various biometric devices to receive biometric input from of the user, such as, for example fingerprint/palm-print device, iris scanning device, heart-rate/pulse-rate measurement device, breathalyzer device, electrocardiogram device (ECG), electroencephalogram (EEG), as well as other biometric devices. The air quality detection device 318 detects/measures quality of air, such as, for example, air temperature, velocity and humidity, carbon dioxide ($CO_2$), carbon monoxide (CO), as well any other detection or measurement.

The audio capture device(s) 322 can include one or more microphones and/or other capture audio devices to receive audio input, while the video capture device(s) 324 can include one or more cameras and/or other video capture devices to receive video input (e.g., streaming video) and/or still image input (e.g., photograph(s)). It is noted that the list of input device is not exhaustive, and one or more other input devices can be provided to receive various input data and information described herein to facilitate the methods, functions and/or other logic as described in this disclosure.

The processing devices 326 can be dedicated to performing certain specific tasks, offloading these tasks from the processor 302. The processing devices 326 include audio processing device 328, video processing device 330 and biometric processing device 334. The audio processing device 328 receives input using the audio capture device(s) 322 and process the input with voice recognition, such as to authenticate the user 401, 501. The video processing device 328 receives input using the video capture device(s) 324 and process the input with image/object recognition, such as to authenticate the user 401, 501 or to determine an object (and associated position) in connection with the connectable vehicle 106 or the home control system 126, assisting with the determination of context. Other dedicated processing devices can be provided.

The output devices 336 output various data, indications and information described herein to facilitate the methods, functions and/or other logic as described in this disclosure. The output devices 336 include display(s) 338, actuation device(s) 340, light emitting device(s) 342, speaker(s) 344 and projection device(s) 346. The display(s) 338 can include one or more displays, such as liquid crystal displays (LCDs) or other display technologies. The light emitting device(s) 342 can include a variety of LEDs. The speaker(s) 344 can be any one or more speakers of various technologies to produce audible sounds. The projection device(s) 346 can be one or more projectors to project certain data, information, or video onto a screen or other surface. Other output devices can be provided. For example, various colors or brightness levels of the LED(s) 342 may indicate various conditions associated with the connectable vehicle 106 or home control system 126.

The communication interfaces 348 provide for the interconnection and communication of the integrated mobile device 104 with mobile computing devices 120, service provider(s) 122, home control systems 126, connectable vehicle(s) 106 and other vehicles 128 in the system 100. The communication interfaces 348 include a vehicle network interface 350, wired communication network interface 352, wireless communication network interface 354, and sensor/tag/beacon interface 356.

The vehicle network interface 350 enables the integrated mobile device 104 to communicate with vehicle sub-systems 116 over the vehicle network(s) 108 and vehicle bus 202. The wired communication network interface 352 (including USB interface) enables the integrated mobile device 104 to communicate with external systems and devices, such as the connectable vehicle 106, using a wired connection such as via USB. The wireless communication network interface 354 enables the integrated mobile device 104 to communicate with external systems and devices, such as the connectable vehicle(s) 106, the home control system(s) 126 and service provider(s) 122, using a wireless connection. The sensor/tag/beacon interface 356 enables the integrated mobile device 104 to communicate with direct sensors 110 and networked sensors 114 of the connectable vehicle 106. Similarly, the sensor/tag/beacon interface 356 can also be used to communicate with various sensors and sub-systems of the home control system(s) 126.

Figure 4:
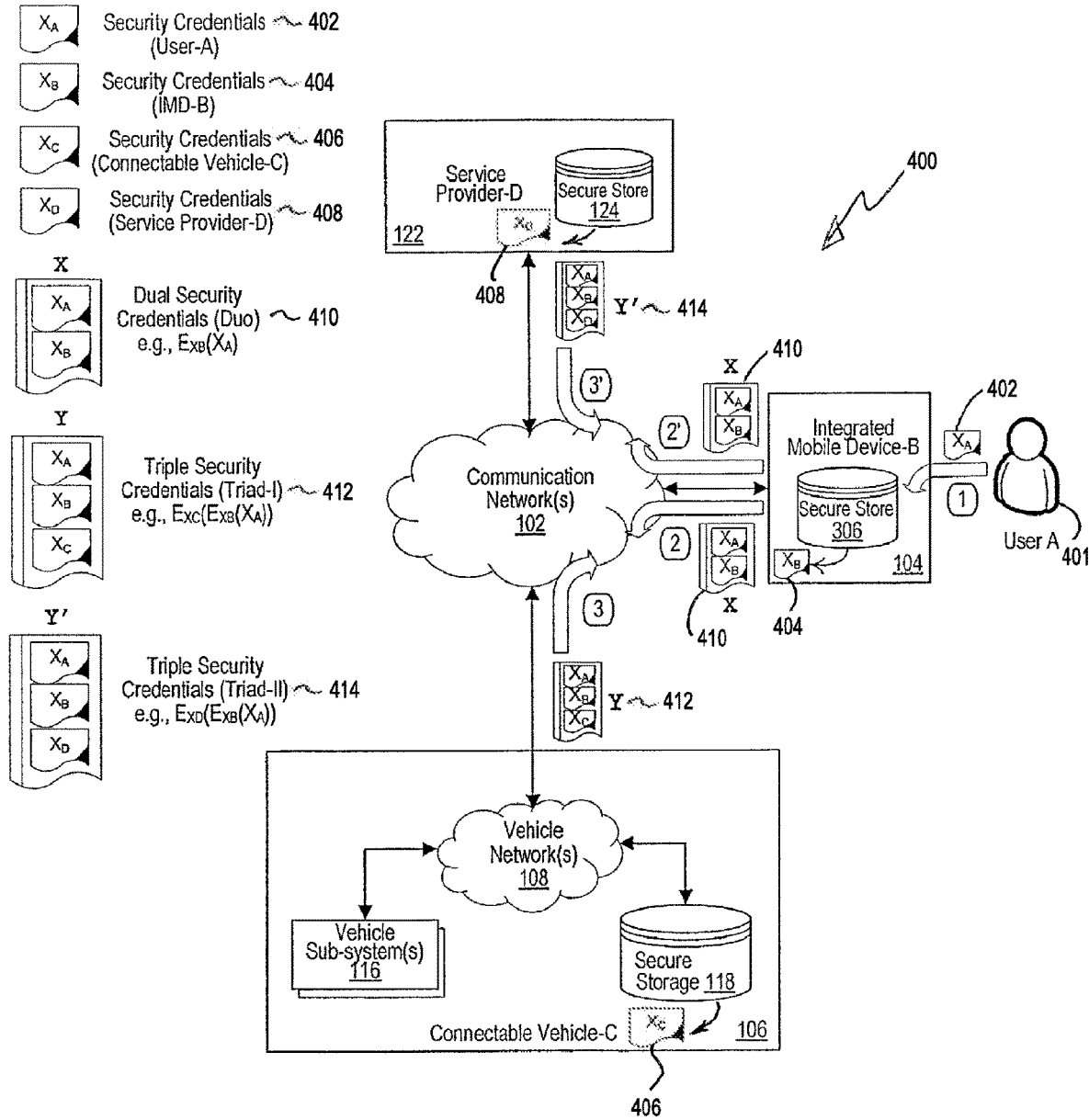
FIG. 4 illustrates a block diagram of example security credentials formed by the connectable vehicle or by the service provider for conducting example communications in the communication system of FIG. 1.

FIG. 4 illustrates a block diagram 400 of example security credentials 410, 412, 414 formed by the connectable vehicle 106 (or home control system 126) and by the service provider 122 in conjunction with integrated mobile device 104 for conducting example communications in the communication system 100. The security credentials assist with authentication and secure communication of information among the user 401, the integrated mobile device 104, the connectable vehicle(s) 106, the service provider(s) 122, the home control system(s) 126, as well as other systems and devices described herein.

As illustrated in FIG. 4, security credentials $X_A$ 402 of user 401 can be provided to the integrated mobile device (IMD) 104. The security credentials $X_A$ 402 acquired from user 401 can be any one of a wide array of security credentials, such as signatures and hash functions representing a variety of biometric credentials (e.g., fingerprint, voice sample, breath sample, facial image, EEG sample, ECG sample, keyed passwords, timed key signatures, and other biometric security credentials).

After acquiring the security credentials $X_A$ 402 from user 401, the integrated mobile device 104 authenticates the user's security credentials against security credentials stored by the integrated mobile device 104, such as in the certificate data store 306. While not shown or described in detail herein, the stored security credentials can be one or more of the foregoing security credentials that are provided by the user 401 during a user-IMD set up process or service provider provisioning conducted previously to the authentication.

The security credentials can be stored in their native version or as a representative version (e.g., a representative signature, hash value of a hash function, or another representative version of the security credentials). If the security credentials are stored as a representative version, then the integrated mobile device 104 can convert the acquired security credentials $X_A$ 402 into a representative version for comparison against the stored representative version of the security credentials for authentication purposes.

After authenticating the user 401, the integrated mobile device 104 combines the user security credentials $X_A$ 402 (e.g., native version or representative version) with security credentials $X_B$ 404 of the integrated mobile device 104 to form dual security credentials X 410 (e.g., duo security credentials). Dual security credentials X 410 can be the result of a cryptographic function on $X_A$ and $X_B$, e.g., $X=E_{XB}(X_A)$. Different cryptographic functions can be used (e.g., MD5, SHA1, SHA2, and other cryptographic functions). While not as strong a result as with cryptography, the dual security credentials X 410 can be the result of a concatenation function on $X_A$ 402 and $X_B$ 404, or another combination of $X_A$ 402 and $X_B$ 404. The security credentials $X_B$ 404 of the integrated mobile device 104 can be stored in the certificate data store 306.

In one example embodiment, the integrated mobile device 104 can transmit the dual security credentials X 410 to the connectable vehicle 106 (e.g., security sub-system 204). The connectable vehicle 106 authenticates dual security credentials X 410 against dual security credentials stored by connectable vehicle 106, such as in the certificate data store 118. While not shown or described in detail herein, the stored dual security credentials were received and stored in the secure storage 118 as a result of the user-IMD set up process conducted previously with respect to the integrated mobile device 104. It should be noted that in the home-based implementation, the home control system 126 can similarly authenticate the dual security credentials X 410 against dual security credentials stored by home control system 126 in a secure storage.

After authenticating the dual security credentials X 410, the connectable vehicle 106 combines the dual security credentials X 410 with security credentials $X_C$ 406 of the connectable vehicle 106 to form triple security credentials Y 412 (e.g., triad security credentials). Security credentials Y 412 can be the result of a cryptographic function on X 410 and $X_C$ 406, e.g., $Y=E_{XC}(X)$ or $Y=E_{XC}(E_{XB}(X_A))$. Different cryptographic functions can be used (e.g., MD5, SHA1, SHA2, and other cryptographic functions). While not as strong a result as with cryptography, triple security credentials Y 412 can be the result of a concatenation function on X 410 and $X_C$ 406, or another combination of X 410 and $X_C$ 406. The security credentials $X_C$ 406 of the connectable vehicle 106 can be stored in the secure storage 118. It should be noted that in the home-based implementation, the home control system 126 can similarly combine the dual security credentials X 410 with security credentials stored by the home control system 126 in the secure storage to form triple security credentials Y 412 (e.g., triad security credentials).

The formation of the triple security credentials Y 412 represents the combination (e.g., cryptographic result) of two prior authentications, which underpins a secure and trusted association between three (3) entities—user 401, integrated mobile device 104, and the connectable vehicle 106. Similarly, Y 412 can also represent a trusted association between the user 401, the integrated mobile device 104, and the home control system 126. In some example embodiments, the connectable vehicle 106 (or home control system 126) can subsequently transmit the triple security credentials Y 412 to the service provider 122 for subsequent authentications provided by the service provider 122 of the dual security credentials X 410, which are received by the service provider 122 from the integrated mobile device 104. The triple security credentials Y 412 can be stored by the service provider 122 in its certificate data store 124 for future authentication and secure session creation.

In another example embodiment, the integrated mobile device 104 can transmit the dual security credentials X 410 to the service provider 122. The service provider 122 authenticates dual security credentials X 410 against dual security credentials stored by service provider 122, such as in the secure storage 124. While not shown or described in detail herein, the stored dual security credentials were received and stored in the secure storage 124 as a result of the user-IMD set up process or provisioning conducted previously with respect to the integrated mobile device 104.

After authenticating the dual security credentials X 410, the service provider 122 combines the dual security credentials X 410 with security credentials $X_D$ 408 of the service provider 122 to form triple security credentials Y' 414 (e.g., triad security credentials). Security credentials Y' 414 can be the result of a cryptographic function on X 410 and $X_D$ 408, e.g., $Y=E_{XD}(X)$ or $Y=E_{XD}(E_{XB}(X_A))$. Different cryptographic functions can be used (e.g., MD5, SHA1, SHA2, and other cryptographic functions). While not as strong a result as with cryptography, triple security credentials Y' 414 can be the result of a concatenation function on X 410 and $X_D$ 408, or another combination of X 410 and $X_D$ 408. The security credentials $X_D$ 408 of the service provider 122 can be stored in the secure storage 124.

The formation of the triple security credentials Y' 414 represents the combination (e.g., cryptographic result) of two prior authentications, which underpins a secure and trusted association among three (3) entities—user 401, integrated mobile device 104, and the service provider 122. In some example embodiments, the service provider 122 can subsequently transmit the triple security credentials Y' 414 to the connectable vehicle 106 for subsequent authentications provided by the connectable vehicle 106 of the dual security credentials X 410, which are received by the connectable vehicle 106 from the integrated mobile device 104. The triple security credentials Y' 414 can be stored by the connectable vehicle 106 in its certificate data store 118 for future authentication and secure session creation. It should be noted that in some example home-based embodiments, the service provider 122 can subsequently transmit the triple security credentials Y' 414 to the home control system 126 for subsequent authentications provided by the home control system 126 of the dual security credentials X 410, which are received by the home control system 126 from the integrated mobile device 104. The triple security credentials Y' 414 can be stored by the home control system 126 in its secure storage for future authentication and secure session creation.

The triple security credentials Y 412 can be used to securitize or authenticate any command or request (hereinafter either or both referenced as instruction) issued by the connectable vehicle 106 (or home control system 126) to service provider 122 or the integrated mobile device 104, or by the integrated mobile device 104 to connectable vehicle 106 (or home control system 126) and the service provider 122. The instruction can include a context-based informational display instruction or context-based control instruction. The foregoing represents a tight and secure association among the three (3) entities: the connectable vehicle 106 (or home control system 126), the integrated mobile device 104 and the user 401. Similarly, triple security credentials Y' 414 can be used to securitize or authenticate any command or request (instruction) issued by the service provider 122 to the connectable vehicle 106 or the integrated mobile device 104, or by the integrated mobile device 104 to connectable vehicle 106 and the service provider 122. It should be noted that in example home-based embodiments, the triple security credentials Y' 414 can be used to securitize or authenticate any instruction issued by the service provider 122 to the home control system 126 or the integrated mobile device 104, or by the integrated mobile device 104 to the home control system 126 and the service provider 122.

Figure 5:
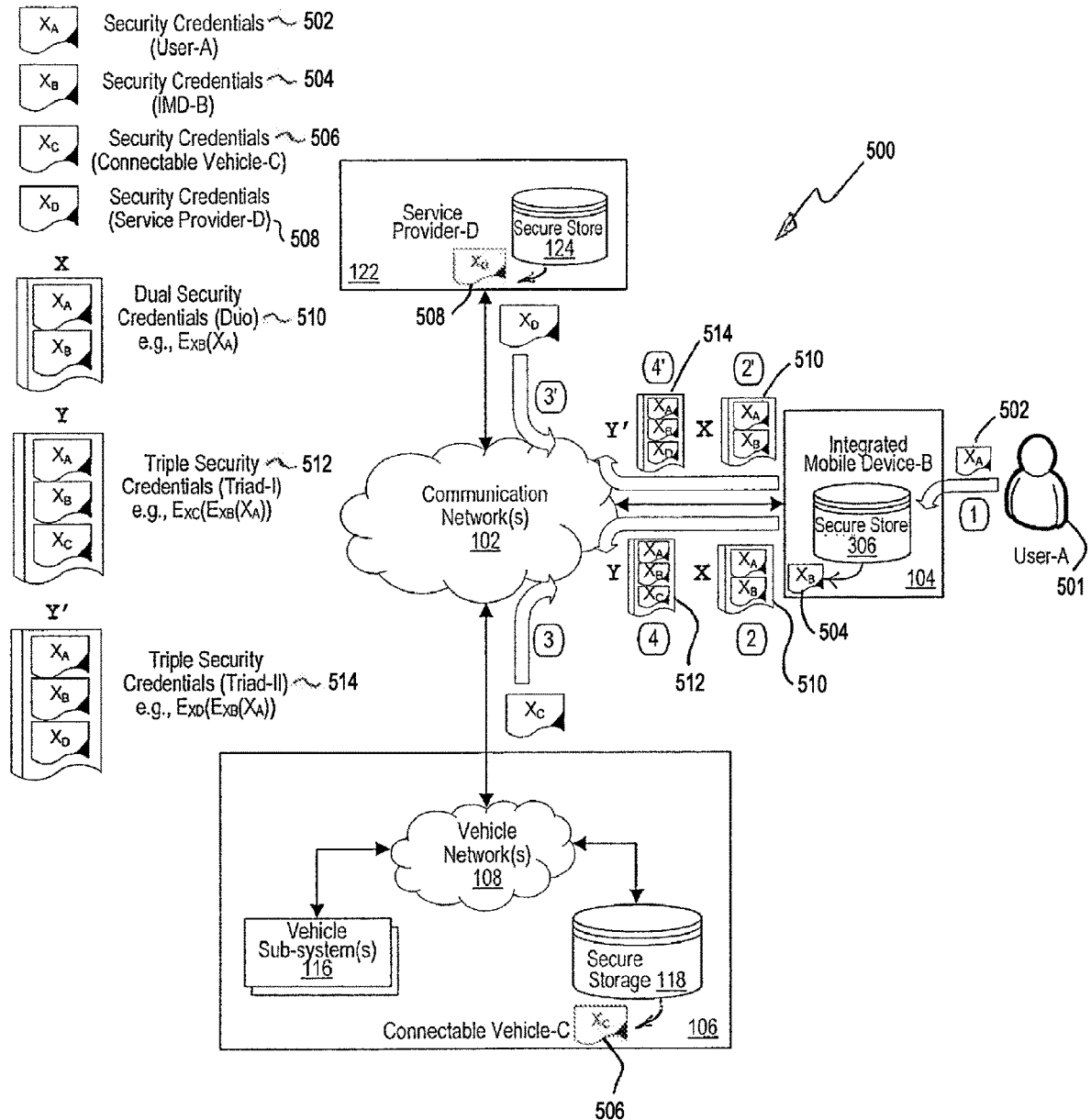
FIG. 5 illustrates a block diagram of example security credentials formed by the integrated mobile device for conducting example communications in the communication system of FIG. 1.

FIG. 5 illustrates a block diagram of example security credentials formed by the by the integrated mobile device 104 based on security credentials of the connectable vehicle 106 (or home control system 126) and security credentials of the service provider 122 for conducting example communications in the communication system 100. The security credentials assist with authentication and secure communication of information among the user 501, the integrated mobile device 104, the connectable vehicle(s) 106, the service provider(s) 122, the home control system(s) 126, as well as other systems and devices described herein.

As illustrated in FIG. 5, security credentials $X_A$ 502 of user 501 can be provided to the integrated mobile device (IMD) 104. The security credentials $X_A$ 502 acquired from user 501 can be any one of a wide array of security credentials, such as signatures and hash functions representing a variety of biometric credentials (e.g., fingerprint, voice sample, breath sample, facial image, EEG sample, ECG sample, keyed passwords, timed key signatures, and other biometric security credentials).

After acquiring the security credentials $X_A$ 502 from user 501, the integrated mobile device 104 authenticates the user's security credentials against security credentials stored by the integrated mobile device 104, such as in the certificate data store 306. While not shown or described in detail herein, the stored security credentials can be one or more of the foregoing security credentials that are provided by the user 501 during a user-IMD set up process or service provider provisioning conducted previously to the authentication.

The security credentials can be stored in their native version or as a representative version (e.g., a representative signature, hash value of a hash function, or another representative version of the security credentials). If the security credentials are stored as a representative version, then the integrated mobile device 104 can convert the acquired security credentials $X_A$ 502 into a representative version for comparison against the stored representative version of the security credentials for authentication purposes.

After authenticating the user 501, the integrated mobile device 104 combines the user security credentials $X_A$ 502 (e.g., native version or representative version) with security credentials $X_B$ 504 of the integrated mobile device 104 to form dual security credentials X 510 (e.g., duo security credentials). Dual security credentials X 510 can be the result of a cryptographic function on $X_A$ and $X_B$, e.g., $X=E_{XB}(X_A)$. Different cryptographic functions can be used (e.g., MD5, SHA1, SHA2, and other cryptographic functions). While not as strong a result as with cryptography, the dual security credentials X 410 can be the result of a concatenation function on $X_A$ 502 and $X_B$ 504, or another combination of $X_A$ 502 and $X_B$ 504. The security credentials $X_B$ 504 of the integrated mobile device 104 can be stored in the certificate data store 306.

In one example embodiment, the connectable vehicle 106 transmits security credentials $X_C$ 506 to the integrated mobile device 104. The security credentials $X_C$ 506 of the connectable vehicle 106 can be stored in its secure storage 118. The integrated mobile device 104 combines the dual security credentials 510 with security credentials $X_C$ 506 of the connectable vehicle 106 to form triple security credentials Y 512 (e.g., triad security credentials). Security credentials Y 512 can be the result of a cryptographic function on X 510 and $X_C$ 506, e.g., $Y=E_{XC}(X)$ or $Y=E_{XC}(E_{XB}(X_A))$. Different cryptographic functions can be used (e.g., MD5, SHA1, SHA2, and other cryptographic functions). While not as strong a result as with cryptography, triple security credentials Y 512 can be the result of a concatenation function on X 510 and $X_C$ 506, or another combination of X 510 and $X_C$ 506. It should be noted that in home-based embodiments, the home control system 126 can similarly transmit its security credentials (e.g., stored in its secure storage) to the integrated mobile device 104. The integrated mobile device 104 can then combine its dual security credentials 510 with the security credentials of the home control system 126 to form triple security credentials Y 512 (e.g., triad security credentials).

The formation of the triple security credentials Y 512 represents the combination (e.g., cryptographic result) of two prior authentications, which underpins a secure and trusted association between three (3) entities—user 501, integrated mobile device 104, and the connectable vehicle 106. Similarly, Y 512 can also represent a trusted association between the user 501, the integrated mobile device 104, and the home control system 126. In some example embodiments, the integrated mobile device 104 can subsequently transmit the triple security credentials Y 512 to the service provider 122 for subsequent authentications provided by the service provider 122. The triple security credentials Y 512 can be stored by the service provider 122 in its secure storage 124 for future authentication and secure session creation.

In another example embodiment, the service provider 122 transmits security credentials $X_D$ 506 to the integrated mobile device 104. The security credentials $X_D$ 508 of the service provider 122 can be stored in its secure storage 124. The integrated mobile device 104 combines the dual security credentials X 510 with security credentials $X_D$ 508 of the service provider 122 to form triple security credentials Y' 514 (e.g., triad security credentials). Security credentials Y' 514 can be the result of a cryptographic function on X 510 and $X_D$ 508, e.g., $Y=E_{XP}(X)$ or $Y=E_{XP}(E_{XB}(X_A))$. Different cryptographic functions can be used (e.g., MD5, SHA1, SHA2, and other cryptographic functions). While not as strong a result as with cryptography, triple security credentials Y' 514 can be the result of a concatenation function on X 510 and $X_D$ 508, or another combination of X 510 and $X_D$ 508.

The formation of the triple security credentials Y' 514 represents the combination (e.g., cryptographic result) of two prior authentications, which underpins a secure and trusted association among three (3) entities—user 501, integrated mobile device 104, and the service provider 122. In some example embodiments, the integrated mobile device 104 can subsequently transmit the triple security credentials Y' 514 to the connectable vehicle 106 for subsequent authentications and securitization of display and control instructions between the connectable vehicle 106 (or home control system 126) and the integrated mobile device 104. The triple security credentials Y' 514 can be stored by the connectable vehicle 106 in its secure storage 118 for future authentication and secure session creation. In home-based environments, the triple security credentials Y' 514 can similarly be stored by the home control system 126 in its secure storage for future authentication and secure session creation.

The triple security credentials Y 512 can be used to securitize or authenticate any command or request (instruction) issued by the connectable vehicle 106 (or home control system 126) to service provider 122 or the integrated mobile device 104, or by the integrated mobile device 104 to connectable vehicle 106 (or home control system 126) and the service provider 122. This represents a tight and secure association among the three (3) entities: the connectable vehicle 106 (or home control system 126), the integrated mobile device 104 and the user 501. Similarly, triple security credentials Y' 514 can be used to securitize or authenticate any command or request (instruction) issued by the service provider 122 to the connectable vehicle 106 or the integrated mobile device 104, or by the integrated mobile device 104 to connectable vehicle 106 and the service provider 122. It should be noted that in example home-based embodiments, the triple security credentials Y' 514 can be used to securitize or authenticate any instruction issued by the service provider 122 to the home control system 126 or the integrated mobile device 104, or by the integrated mobile device 104 to the home control system 126 and the service provider 122.

Figure 6:
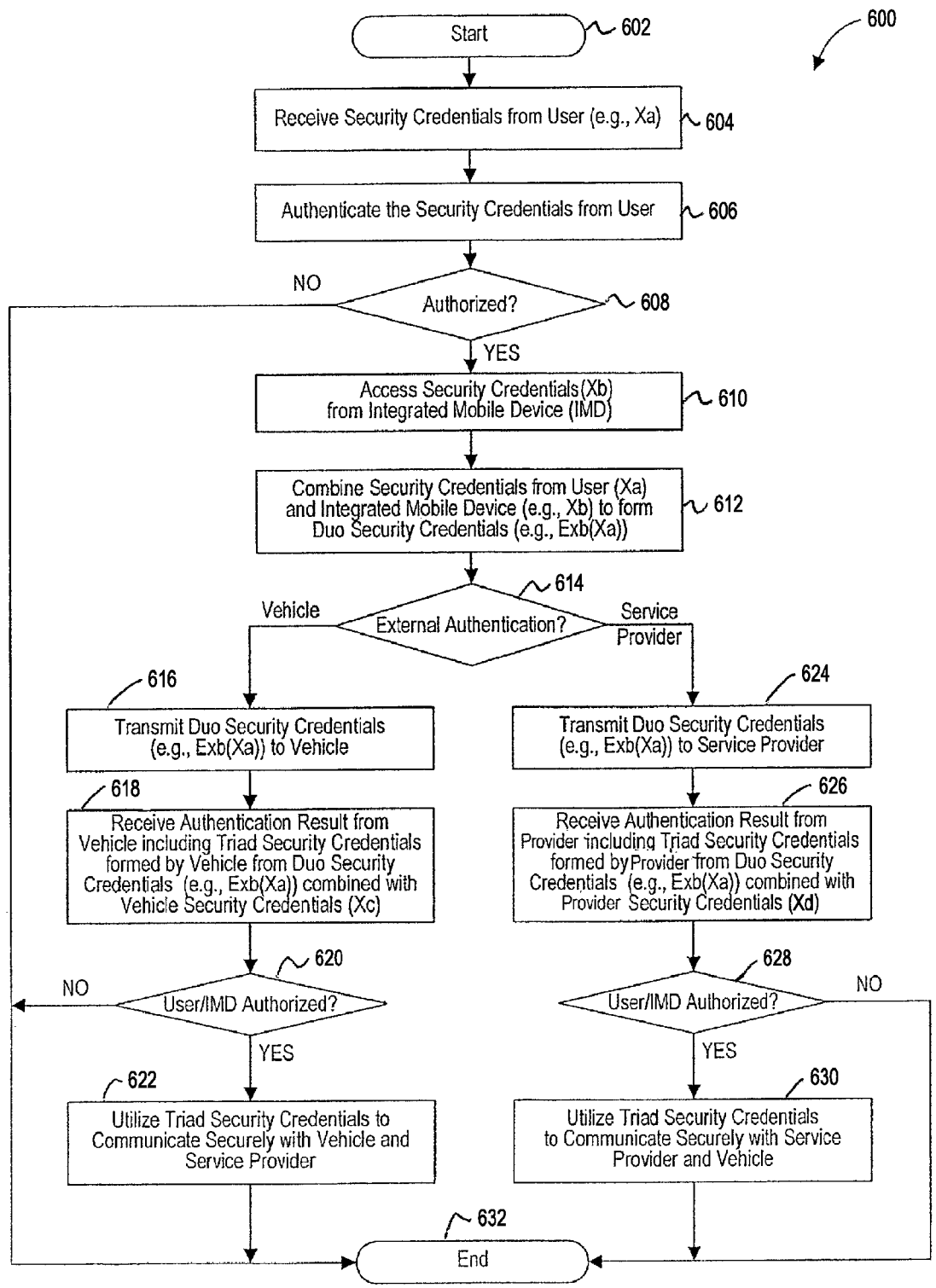
FIG. 6 is a flowchart that illustrates an example method of forming security credentials in accordance with FIG. 4 to conduct example communications in the communication system of FIG. 1.

FIG. 6 is a flowchart that illustrates an example method 600 of forming security credentials in accordance with FIG. 4 to conduct example secure and authenticated communications in the communication system 100.

The method 600 begins at operation 602. At operation 604, the integrated mobile device 104 receives security credentials (e.g., $X_A$) from the user 401. At operation 606, the integrated mobile device 104 authenticates the security credentials (e.g., $X_A$) received from the user 401. At operation 608, a determination is made as to whether the user 401 is authorized with respect to the integrated mobile device 104, e.g., to perform one or more commands or requests.

If is it determined at operation 608 that the user 401 is authorized, the method continues at operation 610, where the integrated mobile device 104 accesses security credentials associated with the integrated mobile device 104 (e.g., $X_B$), such as from certificate data store 306. At operation 612, the integrated mobile device 104 combines the security credentials (e.g., $X_A$) of the user 401 and the security credentials (e.g., $X_B$) of the integrated mobile device 104 to form dual security credentials (e.g., $E_{XB}(X_A)$), as described with reference to FIG. 4, for example. However, if is it determined at operation 608 that the user 401 is not authorized, the method 600 ends at operation 632.

At operation 614, a determination is made by the integrated mobile device 104 as to which entity (or system) is to conduct external authentication of the dual security credentials (e.g., $E_{XB}(X_A)$). If it is determined that vehicle authentication is to be performed, then the method 600 continues at operation 616, where the integrated mobile device 104 transmits the dual security credentials (e.g., $E_{XB}(X_A)$) to the connectable vehicle 106. At operation 618, the integrated mobile device 104 receives an authentication result from the connectable vehicle 106. The authentication result includes an indication of whether the dual security credentials (e.g., $E_{XB}(X_A)$) were authorized, and can further include the triple security credentials (e.g., $(E_{XC}(E_{XB}(X_A)))$ formed by the connectable vehicle 106 upon authorization of the dual security credentials.

At operation 620, a determination is made based on the authentication result received from the connectable vehicle 106, as to whether the dual security credentials (e.g., $E_{XB}(X_A)$) were authorized by the connectable vehicle 106. If it is determined at operation 620 that the dual security credentials (e.g., $E_{XB}(X_A)$) were authorized, the method continues at operation 622, where the triple security credentials (e.g., $(E_{XC}(E_{XB}(X_A)))$ formed by the connectable vehicle 106 are utilized to communicate securely among the integrated mobile device 104, the connectable vehicle 106, and the service provider 122. For example, the triple security credentials (e.g., $(E_{XC}(E_{XB}(X_A)))$ can be used to encrypt the communication messages, or one or more sessions established using the triple security credentials. Thereafter, the method 600 ends at operation 632. If it is determined at operation 620 that the dual security credentials (e.g., $E_{XB}(X_A)$) were not authorized, the method similarly ends at operation 632.

If at operation 614 it is determined that service provider authentication is to be performed, then the method 600 continues at operation 624 where the integrated mobile device 104 transmits the dual security credentials (e.g., $E_{XB}(X_A)$) to the service provider 122. At operation 626, the integrated mobile device 104 receives an authentication result from the service provider 122. The authentication result includes an indication of whether the dual security credentials (e.g., $E_{XB}(X_A)$) were authorized, and can further include the triple security credentials (e.g., $(E_{XD}(E_{XB}(X_A)))$ formed by the service provider 122 upon authorization of the dual security credentials.

At operation 628, a determination is made based on the authentication result received from the service provider 122, as to whether the dual security credentials (e.g., $E_{XB}(X_A)$) were authorized by the service provider 122. If it is determined at operation 628 that the dual security credentials (e.g., $E_{XB}(X_A)$) were authorized, the method continues at operation 630, where the triple security credentials (e.g., $(E_{XD}(E_{XB}(X_A)))$ formed by the service provider 122 are utilized to communicate securely among the integrated mobile device 104, the connectable vehicle 106, and the service provider 122. For example, the triple security credentials (e.g., $(E_{XD}(E_{XB}(X_A)))$ can be used to encrypt the communication messages, or one or more sessions established using the triple security credentials. Thereafter, the method 600 ends at operation 632. If it is determined at operation 628 that the dual security credentials (e.g., $E_{XB}(X_A)$) were not authorized, the method similarly ends at operation 632.

Figure 7:
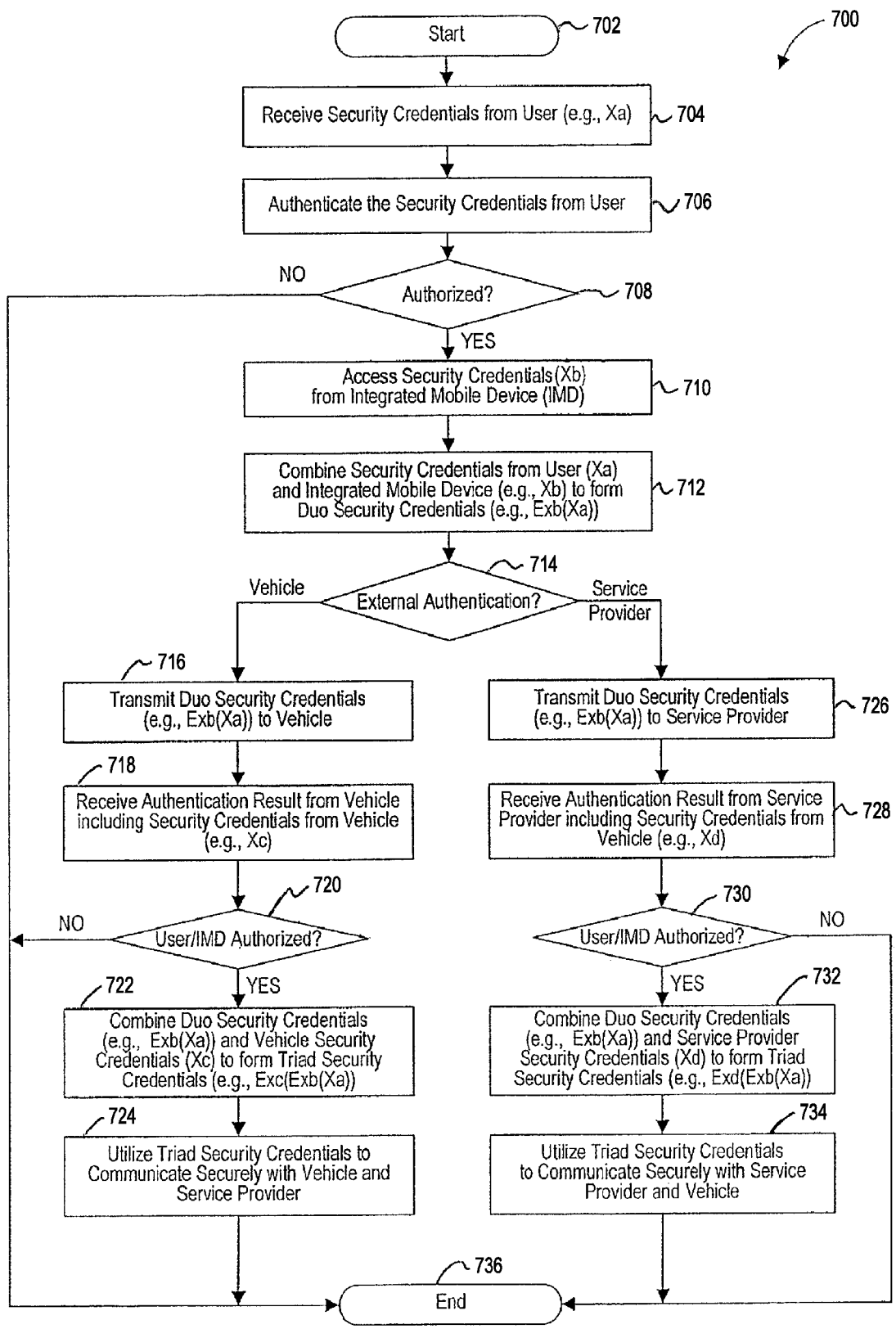
FIG. 7 is a flowchart that illustrates an example method of forming security credentials in accordance with FIG. 5 to conduct example communications in the communication system of FIG. 1.

FIG. 7 is a flowchart that illustrates an example method 700 of forming security credentials in accordance with FIG. 5 to conduct example secure and authenticated communications in the communication system 100.

The method 700 begins at operation 602. At operation 704, the integrated mobile device 104 receives security credentials (e.g., $X_A$) from the user 501. At operation 706, the integrated mobile device 104 authenticates the security credentials (e.g., $X_A$) received from the user 501. At operation 708, a determination is made as to whether the user 501 is authorized with respect to the integrated mobile device 104, e.g., to perform one or more commands or requests.

If is it determined at operation 708 that the user 501 is authorized, the method 700 continues at operation 710, where the integrated mobile device 104 accesses security credentials associated with the integrated mobile device 104 (e.g., $X_B$), such as from certificate data store 306. At operation 712, the integrated mobile device 104 combines the security credentials (e.g., $X_A$) of the user 501 and the security credentials (e.g., $X_B$) of the integrated mobile device 104 to form dual security credentials (e.g., $E_{XB}(X_A)$), as described with reference to FIG. 5, for example. However, if is it determined at operation 708 that the user 501 is not authorized, the method 700 ends at operation 736.

At operation 714, a determination is made by the integrated mobile device 104 as to which entity (or system) is to conduct external authentication of the dual security credentials (e.g., $E_{XB}(X_A)$). If it is determined that vehicle authentication is to be performed, then the method 700 continues at operation 716, where the integrated mobile device 104 transmits the dual security credentials (e.g., $E_{XB}(X_A)$) to the connectable vehicle 106. At operation 718, the integrated mobile device 104 receives an authentication result from the connectable vehicle 106. The authentication result includes an indication of whether the dual security credentials (e.g., $E_{XB}(X_A)$) were authorized, and can further include the security credentials associated with the connectable vehicle (e.g., $X_C$) provided upon authorization of the dual security credentials.

At operation 720, a determination is made based on the authentication result received from the connectable vehicle 106, as to whether the dual security credentials (e.g., $E_{XB}(X_A)$) were authorized by the connectable vehicle 106. If it is determined at operation 720 that the dual security credentials (e.g., $E_{XB}(X_A)$) were authorized, the method continues at operation 722, where integrated mobile device 104 forms the triple security credentials (e.g., $(E_{XC}(E_{XB}(X_A)))$ based on the dual security credentials (e.g., $E_{XB}(X_A)$) and the security credentials associated with the connectable vehicle (e.g., $X_C$) provided by the connectable vehicle 106.

At operation 724, the triple security credentials (e.g., $(E_{XC}(E_{XB}(X_A)))$ formed by the integrated mobile device 104 are utilized to communicate securely among the integrated mobile device 104, the connectable vehicle 106, and the service provider 122. For example, the triple security credentials (e.g., $(E_{XC}(E_{XB}(X_A)))$ can be used to encrypt the communication messages, or one or more sessions established using the triple security credentials. Thereafter, the method 700 ends at operation 736. If it is determined at operation 720 that the dual security credentials (e.g., $E_{XB}(X_A)$) were not authorized, the method similarly ends at operation 736.

If at operation 714 it is determined that service provider authentication is to be performed, then the method 700 continues at operation 726 where the integrated mobile device 104 transmits the dual security credentials (e.g., $E_{XB}(X_A)$) to the service provider 122. At operation 728, the integrated mobile device 104 receives an authentication result from the service provider 122. The result includes an indication of whether the dual security credentials (e.g., $E_{XB}(X_A)$) were authorized, and can further include the security credentials associated with the service provider 122 (e.g., $X_D$) provided upon authorization of the dual security credentials.

At operation 730, a determination is made based on the authentication result received from the service provider 122, as to whether the dual security credentials (e.g., $E_{XB}(X_A)$) were authorized by the service provider 122. If it is determined at operation 730 that the dual security credentials (e.g., $E_{XB}(X_A)$) were authorized, the method 700 continues at operation 732, where mobile device 104 forms the triple security credentials (e.g., $(E_{XD}(E_{XB}(X_A)))$ based on the dual security credentials (e.g., $E_{XB}(X_A)$) and the security credentials associated with the service provider (e.g., $X_D$) provided by the service provider 122.

At operation 734, the triple security credentials (e.g., $(E_{XD}(E_{XB}(X_A)))$ formed by the integrated mobile device 104 are utilized to communicate securely among the integrated mobile device 104, the connectable vehicle 106, and the service provider 122. For example, the triple security credentials (e.g., $(E_{XD}(E_{XB}(X_A)))$ can be used to encrypt the communication messages, or one or more sessions established using the triple security credentials. Thereafter, the method 700 ends at operation 736. If it is determined at operation 730 that the dual security credentials (e.g., $E_{XB}(X_A)$) were not authorized, the method similarly ends at operation 736.

It should be noted that the foregoing functionality of the connected vehicle 106 described with reference to FIGS. 6 and 7 can similarly be performed by the home control system 126. Moreover, in view of FIGS. 4-7, seamless mobility can be provided to the user 401, 501, as the user (integrated mobile device 104) transitions between the connectable vehicle 106 and a connected home (home control system 126), while assuring authentication of the components and securitization of instructions among the components in the system 100 of FIG. 1.

Figure 8:
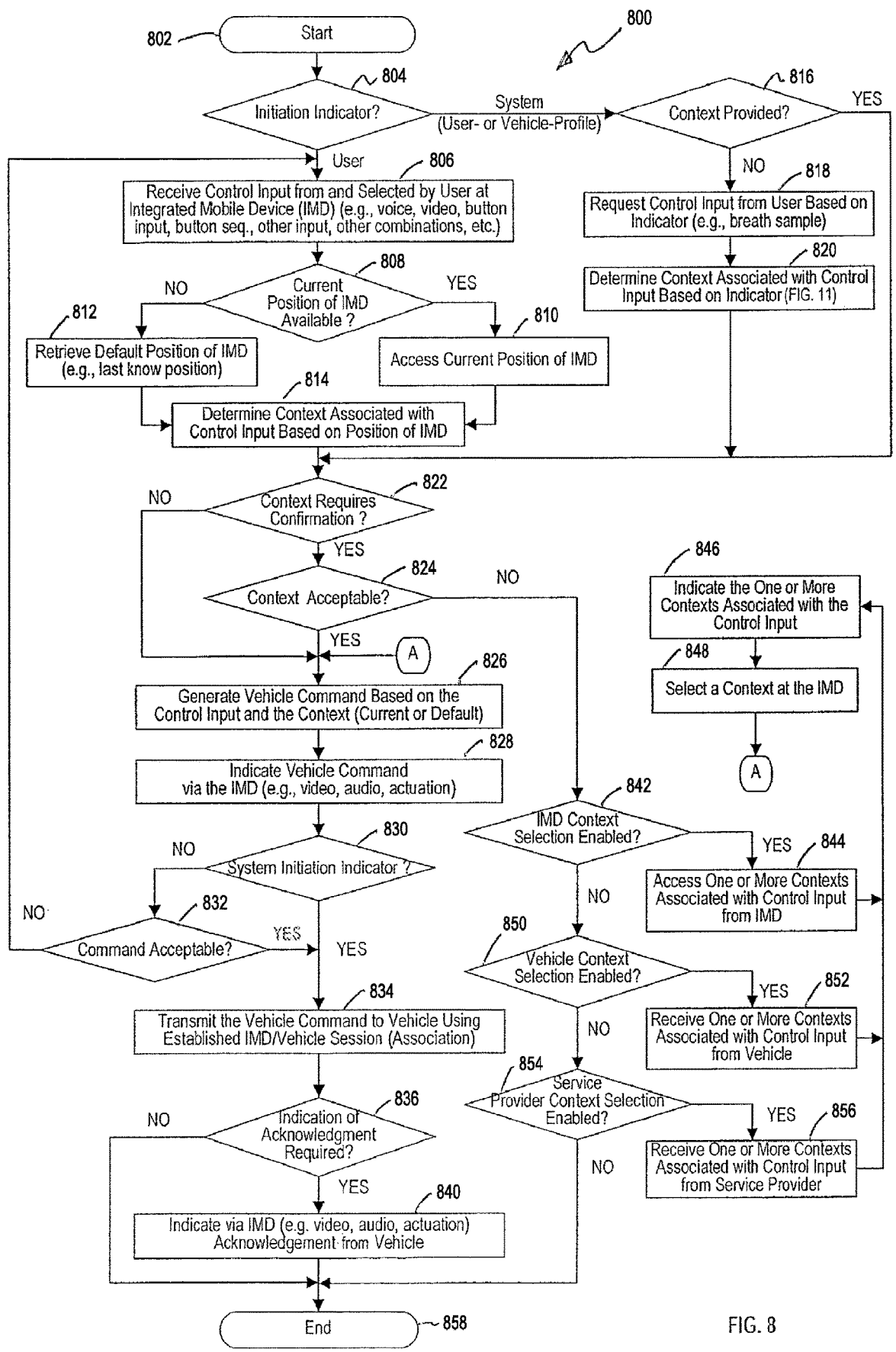
FIG. 8 is a flowchart that illustrates an example method of providing context-based control associated with the connectable vehicle of FIG. 1.

FIG. 8 is a flowchart that illustrates an example method 800 of providing context-based control associated with the connectable vehicle 106.

The method 800 provides contextualized control of vehicle and service provider functions on the integrated mobile device 104, typically wearable by a vehicle operator. Such tight integration of vehicle security, infotainment and control functions with the user provides for enhanced security and usability, while enabling novel ways of context-based user-vehicle and user-service provider interactions. Specifically, the described improvements enable context-based control functionality by integrating the user 401, 501 of the integrated mobile device 104 with the various systems, sub-systems and/or components of the connectable vehicle 104, the home control system 126, and the service provider 122.

In this example embodiment, the context can be defined as one or more of the following factors: 1) integrated mobile device location with reference to the vehicle, home control system 126, and/or their sub-systems and components; 2) user-vehicle/user-house functional activity category; and 3) user-service provider functional activity category. Given a certain user input, different contexts can result in different types of control/display/security functional activities (or actions) undertaken by one or more systems. Additionally or alternatively, the context can include factors as described herein with reference to FIG. 1.

The method 800 begins at operation 802, where an initiation indicator is obtained or otherwise received by the integrated mobile device 104. The initiation indicator can be a user interrupt or a system interrupt received by the integrated mobile device 104. For example, the initiation indicator can be an input by the user 401, 501 with respect to the integrated mobile device 104, or can be a system indicator automatically generated as a result of anomalous user and/or vehicle activity (e.g., motion, biometric and/or other data associated with user, telemetry and/or other data associated with the vehicle and obtained over the vehicle network(s) 108 from various vehicle sub-systems), or can be a system indicator automatically generated by the home control system 126 (e.g., state change or activity detection).

At operation 804 a determination is made as to whether the initiation indicator is a user initiation indicator or a system initiation indicator. If it is determined at operation 804 that the indicator is a user initiation indicator, then the method 800 continues at operation 806, where the integrated mobile device 104 receives control input from the user (user input), e.g., voice, video, breath sample, EEG sample, ECG sample, button input, button sequence and/or timed input, other type of input, or a combination of different inputs.

At operation 808, the integrated mobile device 104 determines whether the current position of the integrated mobile device 104 in reference to the connectable vehicle 106 (e.g., body frame or component) is available. If it is determined at operation 808 that the current position is available, then at operation 810 the integrated mobile device 104 accesses the current position of the integrated mobile device 104. The current position of the integrated mobile device 104 can be determined based on proximity to a sensor 110, 114, triangulation among various sensors 110, 114, or another mechanism. For example, the current position can be obtained from various input devices 308 and processing devices 326 of the integrated mobile device 104, e.g., image recognition, GPS positioning, accelerometer information, audio information, as well as information from other input devices 308 and processing devices 326, and various combinations of information. The current position can be used to update a default position of the integrated mobile device 104, and the current position can be determined by integrated mobile device 104 at various intervals (e.g., every second, or another less/more frequent interval).

If it is determined at operation 808 that the current position is not available, then at operation 812 the integrated mobile device 104 retrieves a default position of the integrated mobile device 104. At operation 814, a context associated with the control input is determined based at least on the position (current or default) of the integrated mobile device 104. Specifically, a default context can be determined based on the default position and a current context can be determined based on the current position. As already described herein, context can also include multiple other factors, state variables of systems and components, user's activity and location of the integrated mobile device 104. Certain portions of the context can be provided by the vehicle subsystems 116, sensors 110, 114 and other controls. Other portions of context can further be determined by the service provider 122 based on communications with connectable vehicle 106, other vehicle(s) 128, integrated mobile device 104, home control system(s) 126 and mobile computing device(s) 120.

Now with reference to operation 804, if it is determined that the indicator is a system initiation indicator, then the method 800 continues at operation 816, where a determination is made as to whether the system initiation indicator provides a context for such initiation. An example of a system initiation indicator is described below with reference to FIG. 10. If it is determined at operation 816 that the context is provided, then the method 800 continues at operation 822. Alternatively, if it is determined at operation 816 that the context is not provided, then at operation 818 control input is requested from the user based on the system initiation indicator, such as for example, requesting that the user 401, 501 provide a breath sample. Other control inputs can be requested, such as voice, video, button input, button sequence and/or timed input, biometric input (e.g., from biometric processing device 334), other type of input, or a combination of different inputs. At operation 820, a context associated with the control input is determined based on the system initiation indicator. An example method of determining the context is described below with reference to FIG. 11.

At operation 822, a determination is made as to whether the context requires confirmation by the user 401, 501. For example, the context that was determined as a result of user initiation can be allowed to be confirmed by the user 401, 501, while the context provided or determined as a result of system initiation may not allow the user 401, 501 to confirm such context. In those situations where several possible contexts are plausible, it can be desirable that the user confirm a particular context or select a preferred context. For example, consider that a certain pattern in movement or displacement of the integrated mobile device 104 indicates a context of "radio volume control", "cabin temperature control", and/or other possible contexts. One of the contexts determined to be appropriate can be presented to the user 401, 501 for confirmation. Alternatively, the possible contexts can be presented to user 401, 501 for selection of the appropriate context preferable to the user.

If at operation 822 it is determined that the context requires confirmation, at operation 824 the integrated mobile device 106 queries the user 401, 501 whether the context is acceptable. If at operation 824 it is determined that the context is acceptable, then at operation 826 a vehicle command (instruction) is generated based on the received control input (user input) and the determined or provided context. At operation 828 the vehicle command (instruction) is indicated via the intergraded mobile device 104, e.g., via video, audio or actuation.

At operation 830, a determination is made as to whether the system initiation indicator was received. If it is determined at operation 830 that the system initiation indicator was received, then at operation 834 the vehicle command (instruction) is transmitted to the connectable vehicle 106 using, for example, a session established between the integrated mobile device 104 and the connectable vehicle 106, which is based on triple security credentials as described with reference to FIGS. 4 and 5. The connectable vehicle 106 receives and executes the command (instruction) to control a component or function of the connectable vehicle 106.

If however it is determined at operation 830 that the system initiation indicator was not received, then at operation 832 a determination is made as to whether the command is acceptable to the user 401, 501. If the command is acceptable at operation 832, the method 800 continues at operation 834. Alternatively, if the command is not acceptable at operation 832, then the method continues at operation 806 for user to establish a different context associated with its control input, such that a different command could be formed.

It should be noted that operations 826-834 can be related to a command targeting the home control system 126, or a component thereof, wherein a command can be transmitted to one or more home appliances over a communication network(s) 102. For example, a certain pattern of shaking the integrated mobile 104 by the user 401, 501 in relation to connectable vehicle 106 (other activity or selection by the user) can result in a context related to turning off all appliances controlled by the home control system 126.

At operation 836, a determination is made as to whether an indication of acknowledgement is required from the connectable vehicle 106 or home control system 126. If it is determined at operation 836 that the indication of acknowledged is required, then at operation 840 the integrated mobile device 104 indicates the indication of acknowledgement received from the connectable vehicle 106. Thereafter, the method 800 ends at operation 858.

Now further with reference to operation 824, if it is determined that the context is not acceptable, then at operation 842 a determination is made as to whether context selection is enabled at the integrated mobile device 104. If it is determined that context selection is enabled at the integrated mobile device 104, then at operation 844 one or more contexts (e.g., list of contexts) associated with the control input are accessed or retrieved by the integrated mobile device 104, such as contexts determined by the processor 302 as a result of interrogating input devices 308 and/or processing device 326, or resulting from the processor 302 communicating with one or more of the mobile computing device 120, service provider(s) 122, home control system(s) 126, and other vehicle(s) 128 over the communication network(s) 102. At operation 846 the one or more contexts retrieved are indicated by the integrated mobile device to the user 401, 501. At operation 848 the user selects a context from the contexts indicated. Thereafter method 800 continues with operations 826-858 based on the context as selected.

If it is determined that context selection is not enabled at the integrated mobile device 104, then at operation 850 a determination is made as to whether context selection is enabled at the connectable vehicle 106. If it is determined that context selection is enabled at the connectable vehicle 106, then at operation 852 one or more contexts (e.g., list of contexts) associated with the control input are requested and received by the integrated mobile device 104 from the connectable vehicle 106. In home-based embodiments, the operations 850, 852 are directed to the home control system 126 and the contexts are received from the home control system 126. The method 800 continues at operations 846 and 848 to allow the user 401, 501 to select a context associated with the control input. Thereafter method 800 continues with operations 826-858 based on the context as selected.

If it is determined that context selection is not enabled at the connectable device 106 or home control system 126, then at operation 854 a determination is made as to whether context selection is enabled at the service provider 122. If it is determined that context selection is enabled at the service provider 122, then at operation 856 one or more contexts (e.g., list of contexts) associated with the control input are requested and received by the integrated mobile device 104 from the service provider 122. The method 800 continues at operations 846 and 848 to allow the user 401, 501 to select a context associated with the control input. Thereafter method 800 continues with operations 826-858 based on the context as selected.

If it is determined at operation 854 that context selection is not enabled at the service provider 122, the method 800 ends at operation 858. In some embodiments, if no context is determined to be available as a result of operations 842, 850, 854, then the integrated mobile device 104 can indicate that no context was available (e.g., via video, audio or actuation) before the method 800 ends. Alternatively, a default context can be selected and the method 800 continued at operation 826. In some embodiments, the default context can also be provided by the home control system(s) 126, e.g., from components of the home control system 126 as impacted by various sensors or actuators of the home control system 126 and associated data elements.

The functionality of the foregoing method 800 can be implemented, and in some implementations adapted, to perform one or more other context-based controls associated with the connectable vehicle 106 or the home control system 126, such as for example, remote vehicle start using passcode input/biometric input, opening of outside door and turning off a security system of a home associated with the home control system 126, recoding and/or display of audio/video from input devices 308 of integrated mobile device 104 by the connectable vehicle 106 or a component (e.g., DVD recorder) of the home control system 126, display/projection by the output device 336 of the integrated mobile device 104 of audio/visual data from the connectable vehicle 106 or a component (e.g., camera) of the home control system 126. In other examples, as the context associated with the home control system 126 changes, various context selection confirmation functions can be presented to the user 401, 501 via output devices 336 of the integrated mobile device 104. Moreover, the commands (control instructions) generated at operation 826 can thus be impacted by a diverse set of contexts determined by various systems, devices and components in the system 100.

Figure 9:
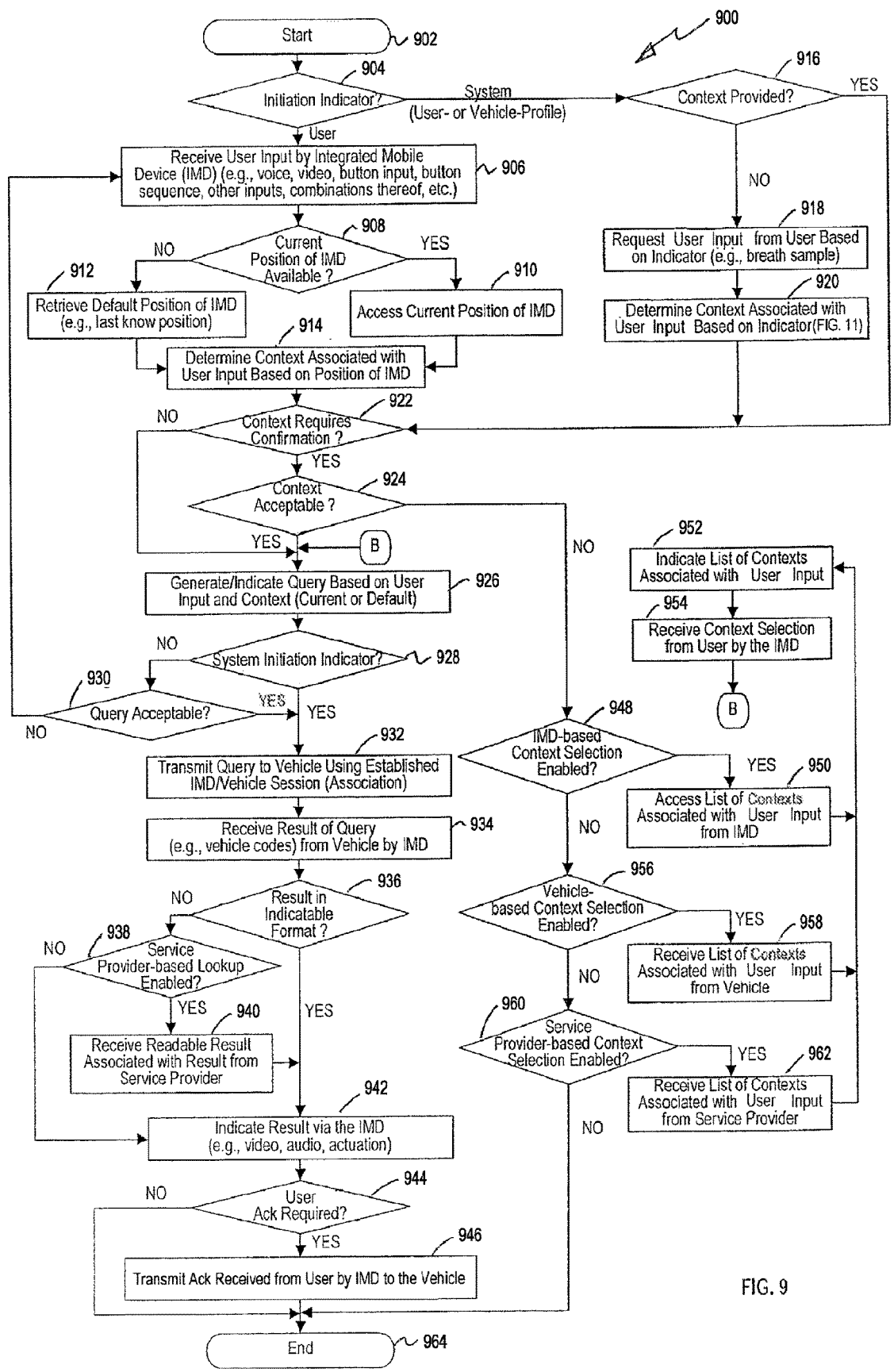
FIG. 9 is a flowchart that illustrates an example method of providing context-based informational indication associated with the connectable vehicle of FIG. 1.

FIG. 9 is a flowchart that illustrates an example method 900 of providing context-based informational indication associated with the connectable vehicle 106 or a home control system 126. Context-based information indication is also referred to herein as contextualized information rendering or shaping.

The method 900 provides contextualized shaping or rendering of information on the integrated mobile device 104, typically wearable by a vehicle operator. Such tight integration of vehicle security, infotainment and control functions with the user provides for enhanced security and usability, while enabling novel ways of context-based user-vehicle and user-service provider interactions. Specifically, the described improvements enable context-based display functionality by integrating the user 401, 501 of the integrated mobile device 104 with the various systems, sub-systems and/or components of the connectable vehicle 104, the home control system 126, and the service provider 122.

The method 900 begins at operation 902, where an initiation indicator is obtained or otherwise received by the integrated mobile device 104. The initiation indicator can be a user interrupt or a system interrupt received by the integrated mobile device 104. For example, the initiation indicator can be an input by the user 401, 501 with respect to the integrated mobile device 104, or can be a system indicator automatically generated as a result of anomalous user and/or vehicle activity (e.g., motion, biometric and/or other data associated with user, telemetry and/or other data associated with the vehicle). The initiation indicator can also be generated by the home control system 126 as a result of home intrusion activity detection or change in state associated with one or more components of the home control system 126.

At operation 904 a determination is made as to whether the initiation indicator is a user initiation indicator or a system initiation indicator. If it is determined at operation 904 that the indicator is a user initiation indicator, then the method 900 continues at operation 906, where the integrated mobile device 104 receives user input from the user (e.g., voice, video, breath sample, EEG sample. ECG sample, button input, button sequence and/or timed input, other type of input, or a combination of different inputs).

At operation 908, the integrated mobile device 104 determines whether the current position of the integrated mobile device 104 in reference to the connectable vehicle 106 is available. If it is determined at operation 908 that the current position is available, then at operation 910 the integrated mobile device 104 accesses the current position of the integrated mobile device 104. The current position of the integrated mobile device 104 can be determined based on proximity to a sensor 110, 114, triangulation among various sensors 110, 114, or another mechanism. For example, the current position can be obtained from various input devices 308 and processing devices 326 of the integrated mobile device 104, e.g., image recognition, GPS positioning, accelerometer information, audio information, as well as information from other input devices 308 and processing devices 326, and various combinations of information. The current position can be used to update a default position of the integrated mobile device 104, and the current position can be determined by the integrated mobile device 104 at various intervals (e.g., every second, or another less/more frequent interval).

If it is determined at operation 908 that the current position is not available, then at operation 912 the integrated mobile device 104 retrieves a default position of the integrated mobile device 104. At operation 914, a context associated with the user input is determined based on the position (current or default) of the integrated mobile device 104. Specifically, a default context can be determined based on the default position and a current context can be determined based on the current position. As already described herein, context can also include multiple other factors, state variables of systems and components, user's activity and location of the integrated mobile device 104. Certain portions of the context can be provided by the vehicle subsystems 116, sensors 110, 114 and other controls. Other portions of context can further be determined by the service provider 122 based on communications with connectable vehicle 106, other vehicle(s) 128, integrated mobile device 104, home control system(s) 126 and mobile computing device(s) 120.

Now with reference to operation 904, if it is determined that the indicator is a system initiation indicator, then the method 900 continues at operation 916, where a determination is made as to whether the system initiation indicator provides a context. An example of a system initiation indicator is described below with reference to FIG. 10. If it is determined at operation 916 that the context is provided, then the method 900 continues at operation 922.

Alternatively, if it is determined at operation 916 that the context is not provided, then at operation 918 control input is requested from the user 401, 501 based on the system initiation indicator, such as for example, requesting that the user 401, 501 provide a breath sample. Other control inputs can be requested, such as voice, video, button input, button sequence and/or timed input, other type of input, or a combination of different inputs. At operation 920, a context associated with the control input is determined based on the system initiation indicator. An example method of determining the context is described below with reference to FIG. 11.

At operation 922, a determination is made as to whether the context requires confirmation by the user 401, 501. For example, the context that was determined as a result of user initiation can be allowed to be confirmed by the user 401, 501, while the context provided or determined as a result of system initiation may not allow the user 401, 501 to confirm such context. As already described herein, in those situations where several possible contexts are plausible, it can be desirable that the user confirm a particular context or select a preferred context. For example, consider that a certain pattern in movement or displacement of the integrated mobile device 104 indicates a context of "radio volume control", "cabin temperature control", and/or other possible contexts. One of the contexts determined to be appropriate can be presented to the user 401, 501 for confirmation. Alternatively, the possible contexts can be presented to user 401, 501 for selection of the appropriate context preferable to the user.

If at operation 922 it is determined that the context requires confirmation, then at operation 924 the integrated mobile device 104 queries the user 401, 501 as to whether the context is acceptable. If at operation 924 it is determined that the context is acceptable, then at operation 926 a query (instruction) is generated based on the received user input, received initiation indicator, and the determined or provided context. In some embodiments, the query can optionally be indicated to the user 401, 501 by the integrated mobile device 104.

At operation 928, a determination is made as to whether a system initiation indicator was received. If it is determined at operation 928 that the system initiation indicator was received, then at operation 932 the query (instruction) is transmitted to the connectable vehicle 106 using, for example, a session established between the integrated mobile device 104 and the connectable vehicle 106, which is based on triple security credentials as described with reference to FIGS. 4 and 5. The connectable vehicle 106 executes the query (instruction) and generates a result of the query (instruction) in relation to a component or function of the connectable vehicle 106. Thereafter, at operation 934 the integrated mobile device 104 receives the result of the query (e.g., vehicle code(s) from the connectable vehicle 106, codes (results) of other components of system 100, and/or other information intended for consumption by the user 401, 501). Accordingly, the query and the result of the query are both functions of the context.

If however it is determined at operation 928 that the system initiation indicator was not received, then at operation 930 a determination is made as to whether the query (instruction) is acceptable to the user 401, 501. If the query (instruction) is acceptable at operation 930, the method 900 continues at operation 932. Alternatively, if the query (instruction) is not acceptable at operation 930, then the method 900 continues at operation 906 for the user 401, 501 to establish a different context associated with its user input, such that a different query (instruction) could be formed.

It should be noted that the operations 926-934 can be related to a query targeting the home control system 126, or a component thereof, wherein a query can be transmitted to one or more home appliances over a communication network(s) 102. For example, a certain pattern of shaking the integrated mobile 104 by the user 401, 501 in relation to connectable vehicle 106 (other activity or selection by the user) can result in a context related to obtaining a status of a system or an appliance controlled by the home control system 126.

At operation 936, a determination is made as to whether the result of the query (instruction) received from the connectable vehicle 106 (or home control system(s) 126, or service provider(s) 122, or other vehicle(s) 128) is in a format that is to be indicated or rendered to the user 401, 501. If it is determined at operation 936 that the result is in the format to be indicated (rendered), then at operation 942 the integrated mobile device 104 indicates the result to the user 401, 501, such as via one or more of video, audio and actuation using one or more of the output devices 336 of the integrated mobile device 104. If it is determined at operation 936 that the result is not in the format to be indicated, then at operation 938 a determination is made as to whether a look-up using the service-provider 122 is enabled. The service provider 122 can assist in translating (or shaping) the result (e.g., vehicle code(s) of connectable vehicle 106 and/or code(s) of components of home control systems 126) to a format more easily consumable or preferred by the user 401, 501.

If at operation 938 it is determined that service-provider look-up is enabled, then at operation 940 the integrated mobile device 104 transmits the result of the query (e.g., vehicle code(s) or component code(s)) to the service provider 122 and receives a shaped (readable or understandable) result that is associated with result which was not in a format to be indicated or rendered. The method 900 continues at operation 942 to indicate or render the shaped result to the user 401, 501, such as via one or more video, audio and/or actuation using one or more of the output devices 336 of the integrated mobile device 104.

However, if at operation 938 it is determined that service-provider look-up is not enabled, then method 900 also continues at operation 942, where the integrated mobile device 104 indicates or renders the non-shaped result (e.g., vehicle code(s) or component code(s)) to the user 401, 501, such as via one or more video, audio and/or actuation using one or more of the output devices 336 of the integrated mobile device 104.

At operation 944, a determination is made as to whether acknowledgement of the indicated/rendered result (or shaped result) is required from the user 401, 501. If it is determined at operation 944 that acknowledgement of the indicated/rendered result or shaped result is required by the user, then at operation 946 the integrated mobile device 104 collects or receives such acknowledgement from the user 401, 501 using one or more of the input devices 308 of the integrated mobile device 104, and transmits such acknowledgement received to the connectable vehicle 106, home control system 126, service provider 122, or other vehicle 128. Thereafter, the method 900 ends at operation 964.

Now further with reference to operation 924, if it is determined that the context is not acceptable, then at operation 948 a determination is made as to whether context selection is enabled at the integrated mobile device 104. If it is determined that context selection is enabled at the integrated mobile device 104, then at operation 950 one or more contexts (e.g., list of contexts) associated with the user input are accessed or retrieved by the integrated mobile device 104, such as contexts determined by the processor 302 as a result of interrogating input devices 308 and/or processing device 326, or resulting from the processor 302 communicating with one or more of the mobile computing device 120, service provide(s) 122, home control system(s) 126, and other vehicle(s) 128 over the communication network(s) 102. At operation 952 the one or more contexts retrieved are indicated by the integrated mobile device to the user 401, 501. At operation 954 the user selects a context from the contexts indicated. Thereafter method 900 continues with operations 826-964 based on the context as selected.

If it is determined that context selection is not enabled at the integrated mobile device 104, then at operation 956 a determination is made as to whether context selection is enabled at the connectable vehicle 106. If it is determined that context selection is enabled at the connectable vehicle 106, then at operation 958 one or more contexts (e.g., list of contexts) associated with the user input are requested and received by the integrated mobile device 104 from the connectable vehicle 106. In home-based embodiments, the operations 956, 958 are directed to the home control system 126 and the contexts are received from the home control system 126. The method 900 continues at operations 952 and 954 to allow the user 401, 501 to select a context associated with the user input. Thereafter method 900 continues with operations 926-964 based on the context as selected.

If it is determined that context selection is not enabled at the connectable device 106 or the home control system 126, then at operation 960 a determination is made as to whether context selection is enabled at the service provider 122. If it is determined that context selection is enabled at the service provider 122, then at operation 962 one or more contexts (e.g., list of contexts) associated with the control input are requested and received by the integrated mobile device 104 from the service provider 122. The method 900 continues at operations 952 and 954 to allow the user 401, 501 to select a context associated with the user input. Thereafter method 800 continues with operations 926-964 based on the context as selected.

If it is determined at operation 960 that context selection is not enabled at the service provider 122, the method 900 ends at operation 964. In some embodiments, if no context is determined to be available as a result of operations 948, 956, 960, then the integrated mobile device 104 can indicate that no context was available (e.g., via video, audio or actuation) before the method 900 ends. Alternatively, a default context can be selected and the method 900 continued at operation 926. In some embodiments, the default context can also be provided by the home control system(s) 126, e.g., from components of the home control system 126 as impacted by various sensors or actuators of the home control system 126 and associated data elements.

The functionality of the foregoing method 900 can be implemented, and in some implementations adapted, to perform one or more other context-based display associated with the connectable vehicle 106 or the home control system 126, such as for example, displaying tire pressure when the integrated mobile device 104 is in the proximity of a tire sensor or tire beacon 110, 114, displaying vehicle engine maintenance information when the integrated mobile device 104 is in the proximity of the vehicle's engine 132, or displaying temperature of a home's thermostat or temperature of a refrigerator/freezer. As the location of the integrated mobile device changes in relation to the connectable vehicle 106 (or home control system 126), the context can change, which changes the queries (instructions) to the connectable vehicle 106 (or the home control system 126) and the results of those queries can be shaped differently based on a service provider 122, as an example. For example, as the user 401, 501 transitions between the connectable vehicle 106 and the home associated with home control system 126, the proximity of the integrated of mobile device 104 to the home control system 126 can trigger a system initiation indicator and generation of a context, which enable the integrated mobile device 104 to issue a query (instruction) to the home control system 126 and to subsequently render to the user 401, 501 a status of the home control systems 126.

Figure 10:
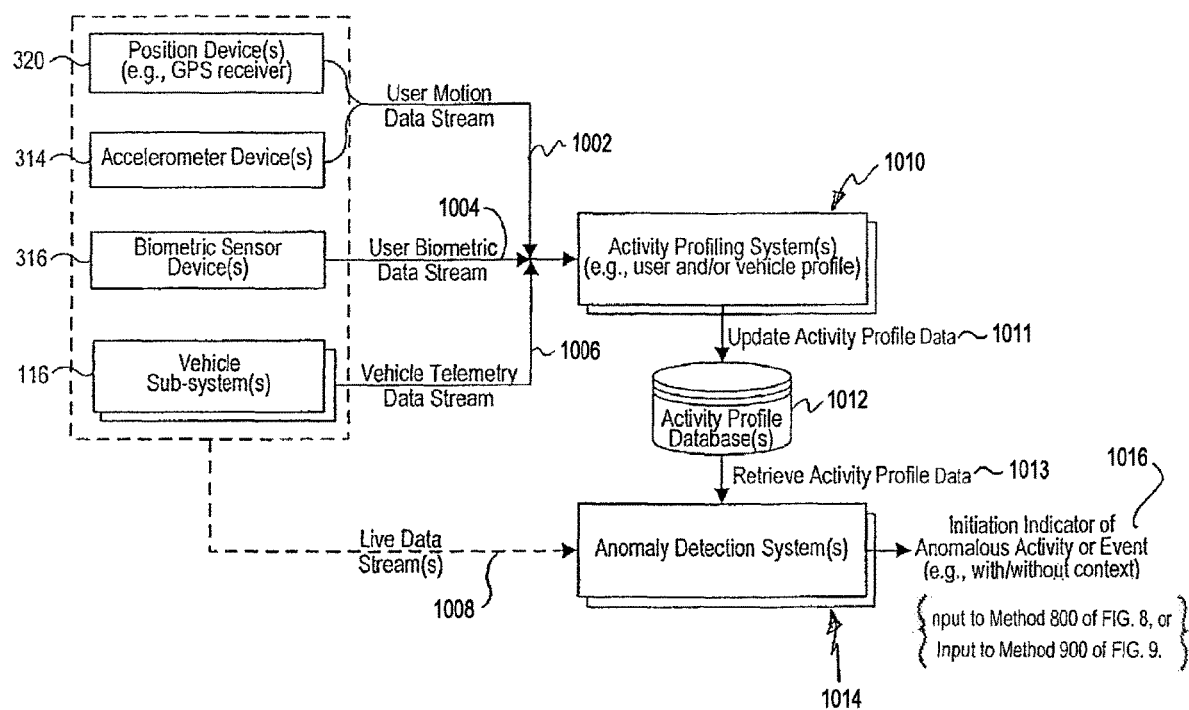
FIG. 10 is a block diagram that illustrates generation of an example system-based initiation indicator based on anomaly detection as an example input to the context-based control of the connectable vehicle of FIG. 1 according to the method of FIG. 8, or as an example input to the context-based informational indication associated with the connectable vehicle of FIG. 1 according to method FIG. 9.

FIG. 10 is a block diagram that illustrates generation of an example system-based initiation indicator that can be used as input to the context-based control of the connectable vehicle 106 according to method 800 of FIG. 8 or as a context-based informational indication associated with the connectable vehicle 106 according to method 900 of FIG. 9.

As illustrated in FIG. 10, the system 100 of FIG. 1 can further include one or more activity profiling system(s) 1010, one or more activity profile databases 1012, and one or more anomaly detection system 1014. The activity profiling system(s) 1010, the activity profile databases 1012, and the anomaly detection system(s) 1014 can be hosted by one of the integrated mobile device 104, the connectable vehicle 106, the service provider 122, the mobile computing device 120, or be distributed amongst two or more of the foregoing.

The activity profiling system(s) 1010 are configured to receive data streams from devices of the integrated mobile device 104 (e.g., devices 314, 316, 320 of FIG. 3), data streams from devices of the connectable vehicle 106 (e.g., sub-systems 116 of FIG. 2), and data streams from the sensors 110, 114 of connectable vehicle 106 to update user profile data and/or vehicle profile data or information in the one or more activity profile databases 1012. Similarly, data streams can also be received by the activity profiling system(s) 1010 from the home control system 126 (e.g., systems, sub-systems, components and sensors of home control system 126), the service providers 122, and the other vehicles 128 to update the user and/or home profile data or information in the one or more activity profile databases 1012 (including user profile data and/or vehicle profile data).

The activity profiling system(s) 1010 periodically updates the data in the one or more activity profile database(s) 1012, e.g., the periodic update interval can be every T seconds, where T is equal to (or greater than) one (1) second. Different periodic update periods can be used. The profiling system(s) 1010 generates statistical informational elements (e.g., activity profile data 1011) that describe various user behaviors, vehicle behaviors, and home control system behaviors—using the data stream(s) 1002, 1004 from the device(s) of the integrated mobile device 104—and the associated impacts on various vehicle behaviors—using data stream(s) 1006 from the sub-systems 116 of the connectable vehicle 106 and sub-systems of the home control system 126.

For example, the statistical information elements (activity profile data 1011) can include data concerning average acceleration (e.g., mean, variance, distribution), breaking distance (e.g., mean, variance, distribution), vehicle turn radius (e.g., mean, variance, distribution), as well as any other vehicle behaviors that are impacted by user behaviors. The activity profiling system(s) 1010 can thus create user/system behavior profile(s) 1011 and store the profile(s) in the activity profile database(s) 1012 for future comparison and reference, in order to determine anomalies associated with the behavior of one or more of the connectable vehicle 106, the home control systems 126, and the user 401, 501.

The user behavior applied to vehicle controls (e.g., acceleration, steering, breaking, an/or other controls) can be expressed as behavior of the connectable vehicle 106 and state of associated variables of the sub-systems of the connectable vehicle 106, as acquired by vehicle's sub-systems 116 and communicated to the activity profiling system(s) 1010 via data streams 1002, 1004 and 1006. Similarly, user behavior applied to the home control system 126 can be expressed as behavior of the home control system 126 and state of associated variables of the sub-systems of the home control system 126, as acquired by sub-systems of the home control system 126 and communicated to the activity profiling system(s) 1010 via data streams 1002, 1004 and one or more other data streams associated with the sub-systems of the home control system 126.

The anomaly detection system(s) 1014 receives live data streams 1008 from one or more sources, including the integrated mobile device 104 (e.g., from devices 314, 316, 320 of FIG. 3), the connectable vehicle 106 (e.g., sub-systems 116 of FIG. 2), and the home control system 126 (e.g., sub-systems of the home control system 126). Moreover, the anomaly detection system(s) 1014 periodically retrieves activity profile data 1013 from the activity profile database(s) 1012 and utilizes its anomaly detection algorithms to compare the live data streams 1008 received against the activity profile data 1013 for anomalous activity. The periodic retrieval interval can be every L seconds, where L is equal to (or greater than) one (1) second. Different periodic retrieval periods can be used. A plurality of anomaly detection algorithms exist in a variety of learning systems, which can find applicability and use in the anomaly detection system(s) 1014.

The anomaly detection system(s) 1014 determines when distribution of the live data stream 1008 differs from distribution of the activity profile data 1013 by more than one or more threshold value(s). The anomaly detection system(s) 1014 can determine a type of anomaly, e.g., unusual acceleration patterns, unusual breaking patterns, unusual turning patterns, etcetera. Based on the difference, anomaly detection system(s) 1014 can trigger creation of an initiation indicator that can be input to the context-based control of the connectable vehicle 106 according to method 800 of FIG. 8 or to the context-based informational indication associated with the connectable vehicle 106 according to method 900 of FIG. 9.

For example, a difference over a first threshold value can be used to execute context-based informational indication, while a difference over a second threshold value can be used to execute context-based control of the connectable vehicle 106. Other implementations can be used. A significant difference between user/vehicle profile (e.g., stored in activity profile database(s) 1012) and live data stream(s) 1008 can cause the anomaly detection system(s) 1014 to notify the service provider 122 and/or disable the connectable vehicle 106, which can be activated by the integrated mobile device 104 or a sub-system 116 of the connectable vehicle 106. A context can be provided as part of the initiation indicator based on the type of anomaly or the threshold exceeded when the live data stream(s) 1008 is compared against activity profile data 1013 in the activity profile database(s) 1012.

Figure 11:
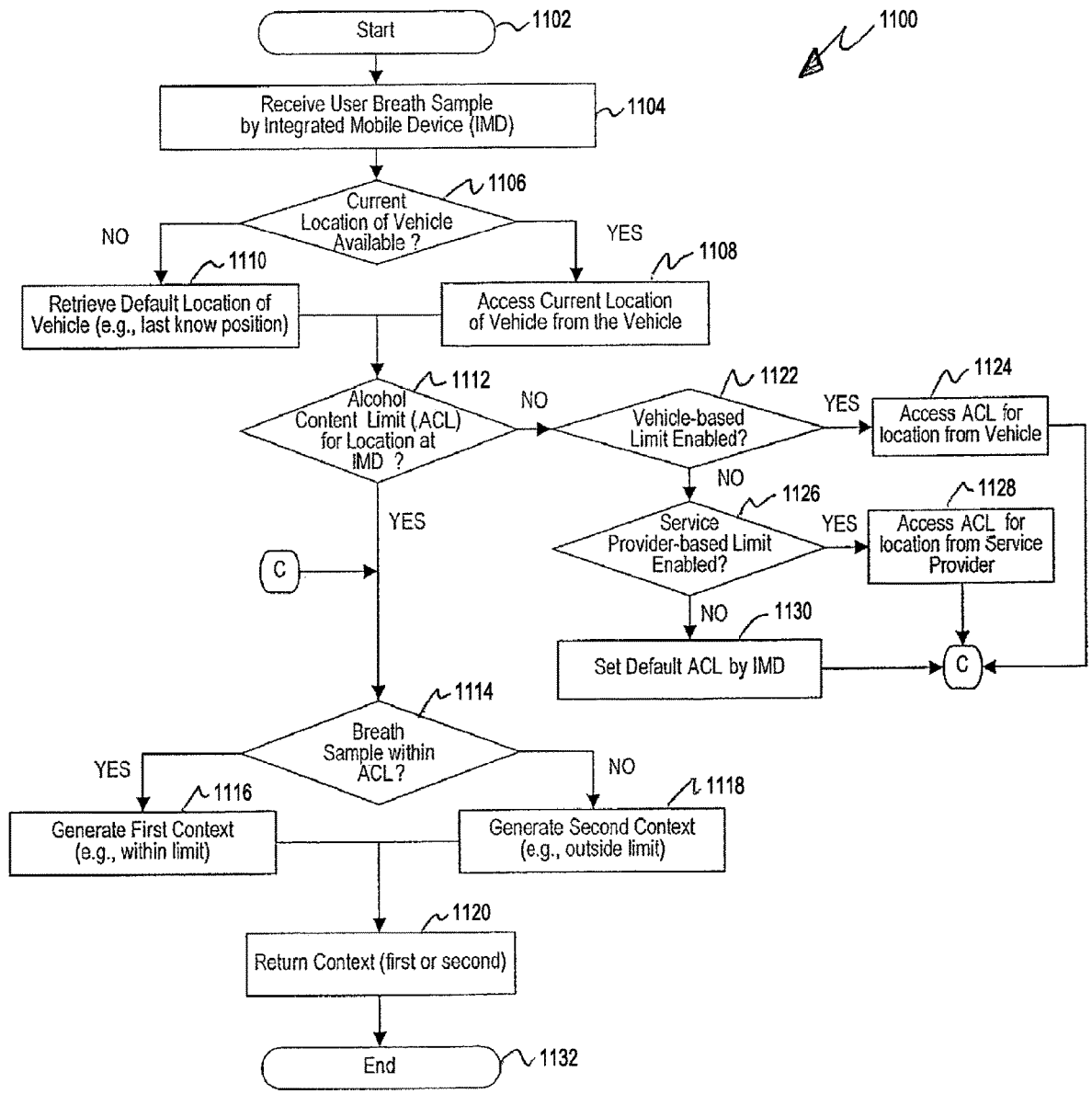
FIG. 11 is a flowchart that illustrates an example method of providing an example context based on breath sample and vehicle location to control the connectable vehicle of FIG. 1 according to FIG. 8, or to provide informational indication associated with the connectable vehicle of FIG. 1 according to FIG. 9.

FIG. 11 is a flowchart that illustrates an example method 1100 of providing an example context to control the connectable vehicle 106 according to FIG. 8 or to provide informational indication associated with the connectable vehicle 106 according to FIG. 9.

As will be described below, the example context is a location-based breathalyzer functional activity that can be used to control the connectable vehicle 106 according to FIG. 8 or as an informational indication of user's sobriety according to FIG. 9, based with alcohol limits associated with the location.

The example method 100 starts at operation 1102. As an example, the method 1100 can be invoked by operation 818 of FIG. 8 or by operation 918 of FIG. 9, which requests the user 401, 501 to provide to a control input or a user input, respectively. In this example, the control input or user input is a breath sample. In various embodiments, the control input or a user input can be different for different functional activities.

Accordingly, at operation 1104 the integrated mobile device 104 receives a breath sample of the user 401, 501 from a biometric sensor device 316 (e.g., breathalyzer). A determination is made at operation 1106 as to whether current location of the connectable vehicle 106 is available, as acquired a sub-system(s) 116 of the connectable vehicle 106. If it is determined that the vehicle location is available, then at operation 1108 the integrated mobile device 104 accesses the current location of the connectable vehicle 106. If it is determined that the vehicle location is not available, then at operation 1110 the integrated mobile device 104 accesses the default location of the connectable vehicle 106, e.g., the last known position.

At operation 1112 a determination is made as to whether alcohol content limit (e.g., blood alcohol content legal limit for a person to drive a vehicle) is available for the current location at the integrated mobile device 104. The legal limit of blood alcohol content (alcohol content limit) can differ by location (e.g., state, jurisdiction, or other location). In some embodiments, the integrated mobile device 104 can store a list of allowed alcohol content limits by location, or a default alcohol content limit associated with the different locations (e.g., 0.08, 0.04, or another alcohol content limit).

If it is determined at operation 1112 that the alcohol content limit is available at the integrated mobile device 104, then at operation 1114 a determination is made as to whether the breath sample received at operation 1104 is within the alcohol content limit for the current location. If the breath sample is within the alcohol content limit, then at operation 1116 a first context is generated, indicating that the breath sample is within the alcohol content limit for the current location. If the breath sample is not within the alcohol content limit, then at operation 1118 a second context is generated, indicating that the breath sample is not within the alcohol content limit for the current location. At operation 1120 the context generated is returned, such as to operation 820 of FIG. 8 or operation 920 of FIG. 9.

If it is determined at operation 1112 that the alcohol content limit is not available at the integrated mobile device 104, then at operation 1122 a determination is made as to whether alcohol content limit determination functionality is enabled at the connectable vehicle 106 (e.g. sub-systems 116). If it is determined that vehicle-based alcohol content limit determination functionality is enabled, then at operation 1124 the alcohol content limit is accessed for the current location from the connectable vehicle 106, and the method 1100 continues with operations 1114-120 to return a context.

If it is determined that vehicle-based alcohol content limit determination functionality is not enabled, then at operation 1126 a determination is made as to whether alcohol content limit determination functionality is enabled at the service provider 122. If it is determined that service provider-based alcohol content limit determination functionality is enabled, then at operation 1128 the alcohol content limit is accessed for the current location from the service provider 122, and the method 1100 continues with operations 1114-120 to return a context.

If it is determined that service provider-based alcohol content limit determination functionality is not enabled, then at operation 1130 a default alcohol content limit is set by the integrated mobile device 104, and the method 1100 continues with operations 1114-120 to return a context.

The example method 1100 returns a context associated with location-based breathalyzer functional activity that can be used for context-base vehicle control of FIG. 8 or for context-based informational of FIG. 9. Thereafter, method 1100 ends at operation 1132.

Figure 12:
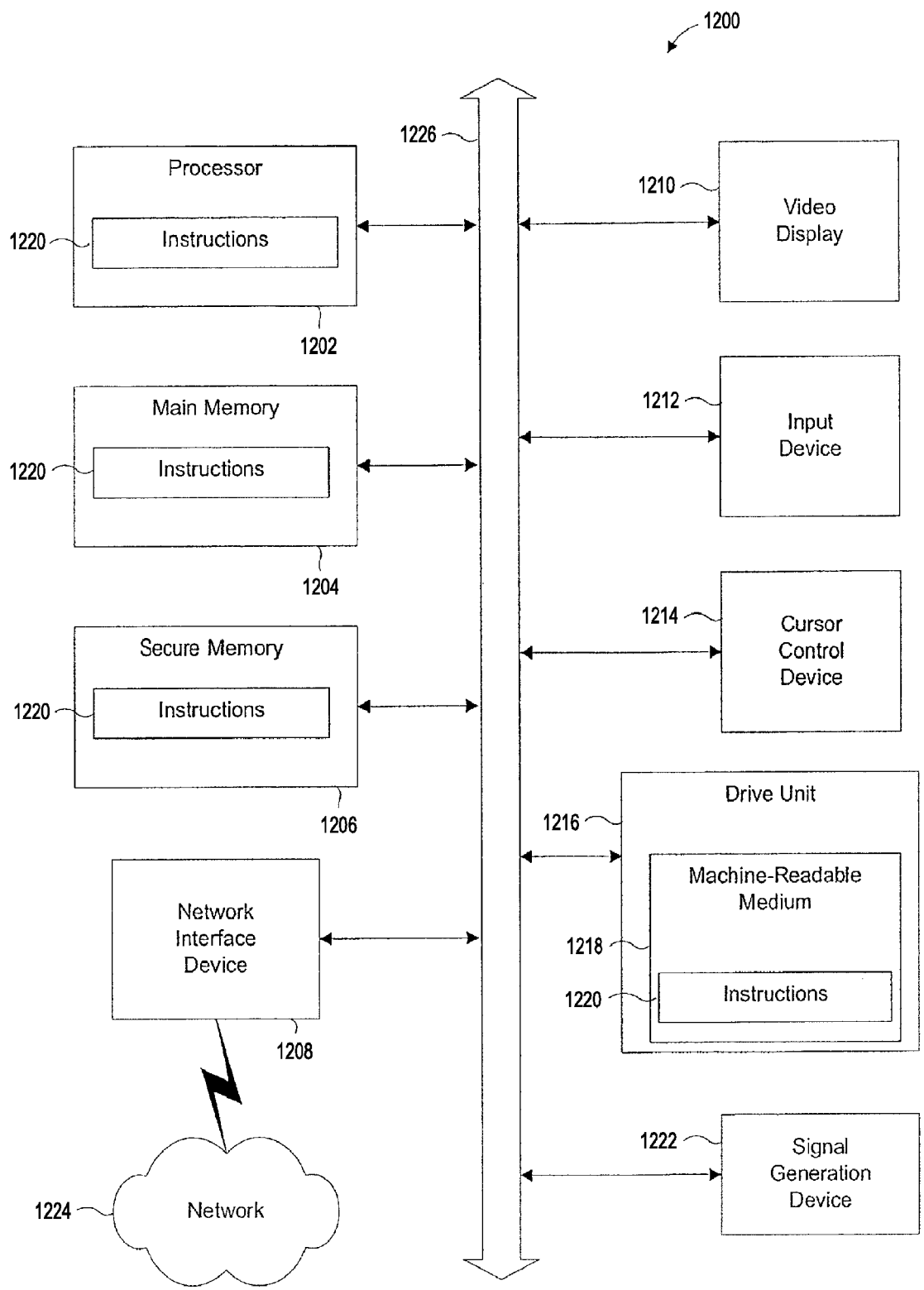
FIG. 12 is a block diagram of an illustrative embodiment of a general computer system.

FIG. 12 is a block diagram of an illustrative embodiment of a general computer system 1200. The computer system 1200 can be implemented as or integrated into the mobile device 104, connectable vehicle 106, mobile device 120, service provider 122, home control system 126, or other vehicles 126, illustrated of FIG. 1. The computer system 1200 can include a set of instructions that can be executed to cause the computer system 1200 to perform any one or more of the methods or computer based functions disclosed herein. The computer system 1200, or any portion thereof, may operate as a standalone device or may be connected, e.g., using a network or other connection, to other computer systems or peripheral devices. For example, the computer system 1200 may be connected other systems and device via network 102.

The computer system 1200 may also be implemented as or incorporated into various devices, such as a personal computer (PC), a tablet PC, a personal digital assistant (PDA), a mobile device (e.g., smartphone), a palmtop computer, a laptop computer, a desktop computer, a communications device, a control system, a web appliance, wearable computing device (e.g., bracelet, glasses, broach, etc.) or any other machine capable of executing a set of instructions (sequentially or otherwise) that specify actions to be taken by that machine. Further, while a single computer system 1200 is illustrated, the term "system" shall also be taken to include any collection of systems or sub-systems that individually or jointly execute a set, or multiple sets, of instructions to perform one or more computer functions.

As illustrated in FIG. 12, the computer system 1200 may include a processor 1202, e.g., a central processing unit (CPU), a graphics-processing unit (GPU), or both. Moreover, the computer system 1200 may include a main memory 1204 and a secure memory 1206 that can communicate with each other via a bus 1226. As shown, the computer system 1200 may further include a video display unit 1210, such as a liquid crystal display (LCD), an organic light emitting diode (OLED), a flat panel display, a solid state display, or a cathode ray tube (CRT). Additionally, the computer system 1200 may include an input device 1212, such as a keyboard, and a cursor control device 1214, such as a mouse. The computer system 1200 can also include a disk drive (or solid state) unit 1216, a signal generation device 1222, such as a speaker or remote control, and a network interface device 1208.

In a particular embodiment or aspect, as depicted in FIG. 12, the disk drive (or solid state) unit 1216 may include a computer-readable medium 1218 in which one or more sets of instructions 1220, e.g., software, can be embedded. Further, the instructions 1220 may embody one or more of the methods or logic as described herein. In a particular embodiment or aspect, the instructions 1220 may reside completely, or at least partially, within the main memory 1204, the static memory 1206, and/or within the processor 1202 during execution by the computer system 1200. The main memory 1204 and the processor 1202 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 1220 or receives and executes instructions 1220 responsive to a propagated signal, so that a device connected to a network 1224 can communicate voice, video or data over the network 1224. Further, the instructions 1220 may be transmitted or received over the network 1224 via the network interface device 1208.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, a system and method of providing contextualized display and control functionality in a secure manner have been described. Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

The invention claimed is:

1. A method of interacting with a vehicle, the method comprising:
   determining, by a mobile computing device, a position of the mobile computing device with respect to a component of a plurality of components of the vehicle, the position identifying the component distinct from other components of the plurality of components;
   obtaining, by the mobile computing device, a context associated with a user input in relation to the component of the vehicle, the context based at least on the position of the mobile computing device with respect to the component of the vehicle as identified;
   generating, by the mobile computing device, an instruction based on the user input and the context;
   transmitting, by the mobile computing device, the instruction to the vehicle to generate a control or indication in connection with the component of the vehicle based on the instruction;
   applying, by a vehicle subsystem, the control to the component of the vehicle; and
   indicating, by the mobile computing device, an acknowledgement or a result associated with the instruction to the vehicle.

2. The method of claim 1, wherein the method further comprises receiving the user input.

3. The method of claim 1, wherein the user input is one of a biometric input, an audio input, a video input, a button input, a button sequence input, a code input, and one or more combinations.

4. The method of claim 1, wherein the method further comprises selecting the context from one or more contexts obtained from at least one of the mobile computing device, the vehicle, a service provider, and a home control system.

5. The method of claim 1, wherein the instruction is a command to control the component of the vehicle.

6. The method of claim 5, wherein the method further comprises generating an indication of the command, the indication comprising one of video, audio, actuation, and one or more combinations.

7. The method of claim 1, wherein the method further comprises obtaining an initiation indicator.

8. The method of claim 7, wherein the initiation indicator is one of a user indicator and a system indicator.

9. The method of claim 7, wherein the initiation indicator comprises the context.

10. The method of claim 7, wherein obtaining the initiation indicator comprises:
    detecting whether there is an anomaly in at least one of user activity and vehicle activity; and
    generating the initiation indicator when the anomaly is detected.

11. The method of claim 1, wherein the method further comprises receiving the result associated with the instruction.

12. The method of claim 11, wherein the method further comprises generating an indication of the result by the mobile computing device, the indication comprising one of video, audio, actuation, and one or more combinations.

13. The method of claim 12, wherein the method further comprises:
    determining whether the result is in indicatable format; and
    obtaining the result in indicatable format when the result was not in indictable format.

14. The method of claim 1, wherein the method further comprises:
    generating a dual security association based on association of user credentials and mobile computing device credentials;
    generating a triple security association based on the dual security association and one of service provider credentials and vehicle credentials; and
    forming a communication session based on the triple security association.

15. A system to interact with a vehicle, the system comprising:
    a mobile computing device comprising:
      a processing device; and
      a memory device to store instructions that, when executed by the processing device, cause the processing device to perform operations comprising:
        determining a position of the mobile computing device with respect to a component of a plurality of components of the vehicle, the position identifying the component distinct from other components of the plurality of components;
        obtaining a context associated with a user input in relation to the component of the vehicle, the context based at least on the position of the mobile computing device with respect to the component of the vehicle as identified;
        generating an instruction based on the user input and the context; and
        transmitting the instruction to the vehicle to generate a control or indication in connection with the component of the vehicle based on the instruction; and
    a vehicle subsystem configured to apply the control or indication to the component of the vehicle, wherein the operations further comprise indicating by the mobile computing device an acknowledgment or a result associated with the instruction to the vehicle.

16. The system of claim 15, wherein the operations further comprise receiving the user input.

17. The system of claim 15, wherein the user input is one of a biometric input, an audio input, a video input, a button input, a button sequence input, a code input, and one or more combinations.

18. The system of claim 15, wherein the operations further comprise selecting the context from one or more contexts obtained from at least one of the mobile computing device, the vehicle, a service provider, and a home control system.

19. The system of claim 15, wherein the instruction is a command to control the component of the vehicle.

20. The system of claim 19, wherein the operations further comprise generating an indication of the command, the indication comprising one of video, audio, actuation, and one or more combinations.

21. The system of claim 15, wherein the operations further comprise obtaining an initiation indicator.

22. The system of claim 21, wherein the initiation indicator is one of a user indicator and a system indicator.

23. The system of claim 21, wherein the initiation indicator comprises the context.

24. The system of claim 21, wherein the operations further comprise:
detecting whether there is an anomaly in at least one of user activity and vehicle activity; and
generating the initiation indicator when the anomaly is detected.

25. The system of claim 15, wherein the operations further comprise receiving the result associated with the instruction.

26. The system of claim 25, wherein the operations further comprise generating an indication of the result by the mobile computing device, the indication comprising one of video, audio, actuation, and one or more combinations.

27. The system of claim 26, wherein the operations further comprise:
determining whether the result is in indicatable format; and
obtaining the result in indicatable format when the result was not in indictable format.

28. The system of claim 26, wherein the operations further comprise:
generating a dual security association based on association of user credentials and mobile computing device credentials;
generating a triple security association based on the dual security association and one of service provider credentials and vehicle credentials; and
forming a communication session based on the triple security association.

* * * * *